US012571917B2

(12) United States Patent
Kim et al.

(10) Patent No.: US 12,571,917 B2
(45) Date of Patent: Mar. 10, 2026

(54) IMAGE SENSOR OPERATING BASED ON PLURALITY OF DELAY CLOCK SIGNALS

(71) Applicant: SAMSUNG ELECTRONICS CO., LTD., Suwon-si (KR)

(72) Inventors: Daeyun Kim, Asan-si (KR); Minsun Keel, Seoul (KR); Myoungoh Ki, Seongnam-si (KR); Yeomyung Kim, Seoul (KR); Myunghan Bae, Seoul (KR); Bumsik Chung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1081 days.

(21) Appl. No.: 17/494,173

(22) Filed: Oct. 5, 2021

(65) Prior Publication Data

US 2022/0107421 A1    Apr. 7, 2022

(30) Foreign Application Priority Data

Oct. 6, 2020    (KR) ........................ 10-2020-0128957

(51) Int. Cl.
| | |
|---|---|
| *G01S 17/00* | (2020.01) |
| *G01S 7/4863* | (2020.01) |
| *G01S 7/4865* | (2020.01) |
| *G01S 17/894* | (2020.01) |
| *H04N 25/76* | (2023.01) |

(52) U.S. Cl.
CPC ......... *G01S 17/894* (2020.01); *G01S 7/4863* (2013.01); *G01S 7/4865* (2013.01); *H04N 25/7795* (2023.01)

(58) Field of Classification Search
USPC ....................................................... 356/5.01
See application file for complete search history.

(56) References Cited

U.S. PATENT DOCUMENTS

| | | | | |
|---|---|---|---|---|
| 7,436,542 B2 * | 10/2008 | Azumai | ............ | H04N 1/00236 |
| | | | | 358/448 |
| 8,713,345 B2 * | 4/2014 | Sugioka | ................ | H03L 7/0805 |
| | | | | 713/600 |
| 9,131,176 B2 | 9/2015 | Kurihara et al. | | |
| 9,584,105 B1 | 2/2017 | Foley | | |
| 9,866,208 B2 * | 1/2018 | Wyland | .................. | G01S 17/14 |

(Continued)

FOREIGN PATENT DOCUMENTS

| | | | | | |
|---|---|---|---|---|---|
| CN | 112689777 A | * | 4/2021 | ............ | G01S 17/89 |
| JP | 2011-160369 A | | 8/2011 | | |

(Continued)

*Primary Examiner* — James R Hulka
(74) *Attorney, Agent, or Firm* — Wolf, Greenfield & Sacks, P.C.

(57) ABSTRACT

An image sensor includes a plurality of pixels and a phase select circuit. Each pixel outputs a pixel signal corresponding to a photoelectric signal in response to a photo gate signal. The phase select circuit outputs delay clock signals of different phases from each other to an object pixel in response to different integration times from each other in a frame. The phase select circuit includes a plurality of delay circuit cells corresponding to at least some pixels of the plurality of pixels. Each of the plurality of delay circuit cells generates a delay clock signal of a certain phase difference from any one of a reference clock signal and an output signal of another delay circuit cell according to a logic state of a select signal.

20 Claims, 23 Drawing Sheets

(56)      References Cited

U.S. PATENT DOCUMENTS

| | | | |
|---|---|---|---|
| 10,320,399 B2 * | 6/2019 | Wurster | H03L 7/0812 |
| 10,598,771 B2 | 3/2020 | Wang et al. | |
| 10,608,035 B2 | 3/2020 | Lin et al. | |
| 10,721,425 B2 * | 7/2020 | Kobayashi | H04N 25/778 |
| 11,445,139 B2 * | 9/2022 | Kim | H04N 25/75 |
| 11,454,711 B2 * | 9/2022 | Kim | H04N 25/704 |
| 11,513,222 B2 * | 11/2022 | Kim | H10F 39/18 |
| 2004/0252391 A1 * | 12/2004 | Azumai | H04N 1/00236 |
| | | | 359/896 |
| 2011/0188619 A1 * | 8/2011 | Sugioka | G06F 1/10 |
| | | | 375/354 |
| 2016/0365846 A1 | 12/2016 | Wyland | |
| 2018/0203102 A1 * | 7/2018 | Wang | G01S 7/4815 |
| 2018/0294816 A1 | 10/2018 | Mccauley et al. | |
| 2019/0198550 A1 * | 6/2019 | Lin | G01S 17/894 |
| 2020/0059621 A1 * | 2/2020 | Kobayashi | H04N 25/778 |
| 2020/0256991 A1 | 8/2020 | Kim et al. | |
| 2020/0314376 A1 | 10/2020 | Kim et al. | |
| 2020/0396405 A1 * | 12/2020 | Kim | H03M 1/1295 |

FOREIGN PATENT DOCUMENTS

| | | |
|---|---|---|
| JP | 2020-137117 | 8/2020 |
| KR | 10-2018-0116323 | 10/2018 |
| KR | 10-2020-0098337 A | 8/2020 |
| KR | 10-2020-0115779 | 10/2020 |

* cited by examiner

<u>11</u>

CLK(0°, 90°, 180°, 270°)

DCC1    DCC2    DCC3    DCC4

|       | CLK_DL1 | CLK_DL2 | CLK_DL3 | CLK_DL4 |
|-------|---------|---------|---------|---------|
| INT1  | 1D      | 2D      | 3D      | 4D      |
| INT2  | 4D      | 1D      | 2D      | 3D      |
| INT3  | 3D      | 4D      | 1D      | 2D      |
| INT4  | 2D      | 3D      | 4D      | 1D      |

|        | CLK_DL1 | CLK_DL2 | CLK_DL3 | CLK_DL4 |
|--------|---------|---------|---------|---------|
| INT1   | 1D      | 2D      | 3D      | 4D      |
| INT2   | 4D      | 1D      | 2D      | 3D      |
| INT3   | 3D      | 4D      | 1D      | 2D      |
| INT4   | 2D      | 3D      | 4D      | 1D      |
| INT5   | 4D      | 3D      | 2D      | 1D      |
| INT6   | 3D      | 2D      | 1D      | 4D      |
| INT7   | 2D      | 1D      | 4D      | 3D      |
| INT8   | 1D      | 4D      | 3D      | 2D      |

IMAGE SENSOR OPERATING BASED ON PLURALITY OF DELAY CLOCK SIGNALS

CROSS-REFERENCE TO RELATED APPLICATIONS

This application claims priority under 35 U.S.C. § 119 to Korean Patent Application No. 10-2020-0128957, filed on Oct. 6, 2020 in the Korean Intellectual Property Office, the disclosure of which is incorporated by reference herein in its entirety.

TECHNICAL FIELD

Embodiments of the inventive concept relate to an image sensor, and more particularly, to an image sensor operating based on a plurality of delayed clock signals and an operating method of the image sensor.

DISCUSSION OF RELATED ART

Time-of-flight (ToF)-based image sensors generate three-dimensional (3D) images of an object by measuring information about the distance to the object. ToF-based image sensors may obtain information about the distance to the object by irradiating the object with a light beam, and measuring the ToF of the light beam until the light beam reflected by the object is received. Information about the distance may include noise due to various causes, which may decrease the accuracy of the obtained information.

SUMMARY

Embodiments of the inventive concept provide an image sensor for measuring distance, in which the image sensor reduces measurement noise.

In an embodiment, an image sensor includes a plurality of pixels and a phase select circuit. Each pixel outputs a pixel signal corresponding to a photoelectric signal in response to a photo gate signal. The phase select circuit outputs delay clock signals of different phases from each other to an object pixel in response to different integration times from each other in a frame. The phase select circuit includes a plurality of delay circuit cells corresponding to at least some pixels of the plurality of pixels. Each of the plurality of delay circuit cells generates a delay clock signal of a certain phase difference from any one of a reference clock signal and an output signal of another delay circuit cell according to a logic state of a select signal.

In an embodiment, an image sensor clock generator includes a controller that outputs a command for generating a photo gate signal, a clock signal generator that generates at least one reference clock signal during each integration time of a plurality of integration times in a frame in response to the command, and a select signal generator in which different pixel groups from each other output a select signal of a first level for receiving a first delay clock signal delayed by a certain phase from the at least one reference clock signal in response to the command during each integration time, and remaining pixel groups output a select signal of a second level for receiving a second delay clock signal delayed by the certain phase from a delay clock signal applied to the other pixel groups.

In an embodiment, an operating method of an image sensor including a plurality of pixels includes outputting delay clock signals of different phases from each other to an object pixel as a photo gate signal in response to different integration times from each other in a frame, and outputting, by the plurality of pixels, a pixel signal corresponding to a photo signal in response to the photo gate signal. Outputting the photo gate signal includes generating, by each of a plurality of delay circuit cells corresponding to at least some of the plurality of pixels, a delay clock signal of a certain phase difference from any one of a reference clock signal and an output signal of another delay circuit cell according to a logic state of a select signal.

BRIEF DESCRIPTION OF THE DRAWINGS

The above and other features of the present inventive concept will become more apparent by describing in detail embodiments thereof with reference to the accompanying drawings, in which:

FIG. 10 is a table of delay levels generated during the first through fourth integration times INT1 through INT4 in FIGS. 9A through 9D.

FIG. 12 is a circuit diagram of a phase select circuit including a first delay circuit cell group and a second delay circuit cell group.

FIG. 14 is a table of delay levels of delay clock signals output according to the embodiments of FIGS. 12 and 13.

Figure 20:
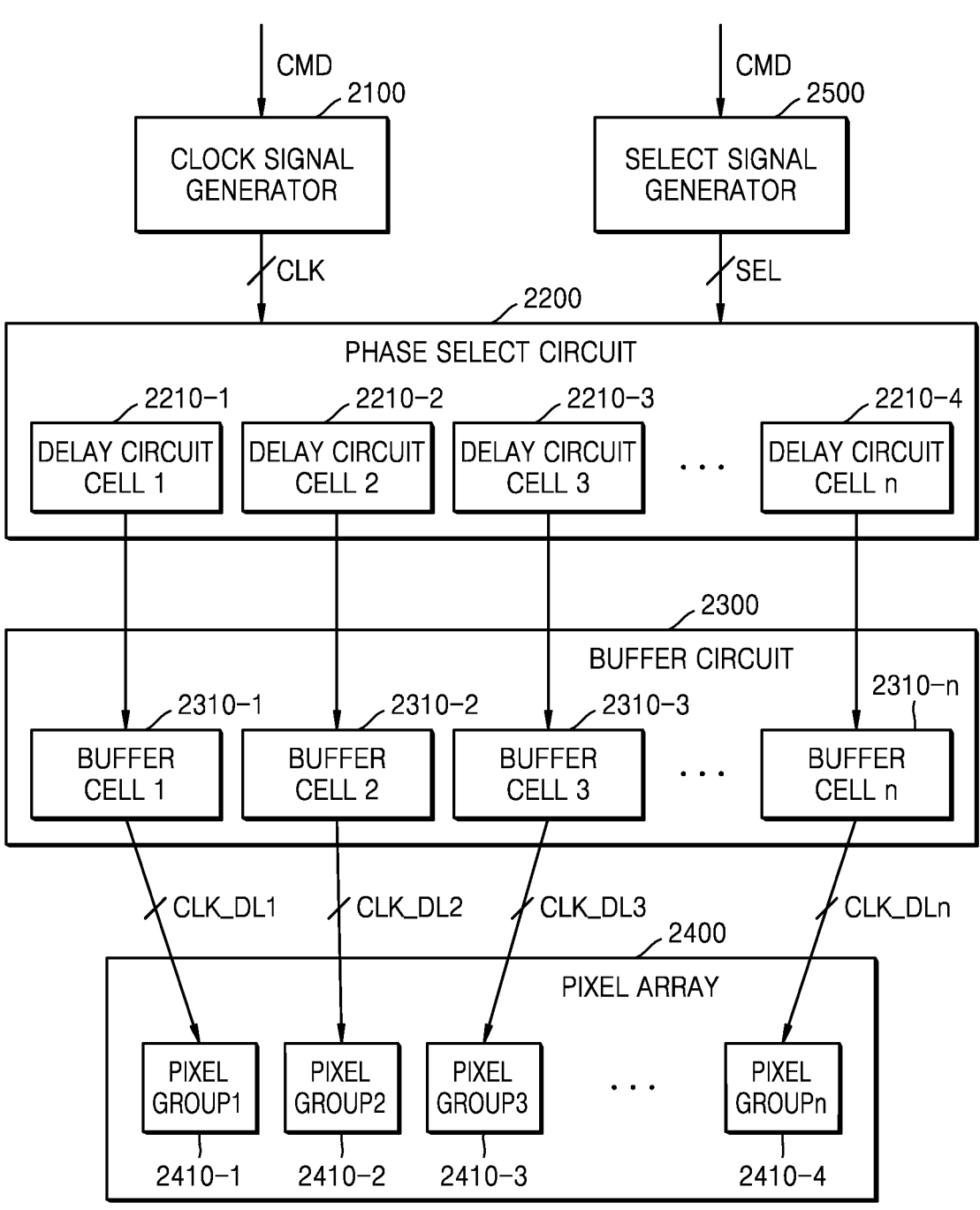

FIG. 20 is a block diagram of a schematic configuration of an image sensor including a buffer circuit, according to an embodiment.

DETAILED DESCRIPTION OF THE EMBODIMENTS

Embodiments of the present inventive concept will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

As used herein, the singular forms "a", "an" and "the" are intended to include the plural forms as well, unless the context clearly indicates otherwise.

Figure 1:
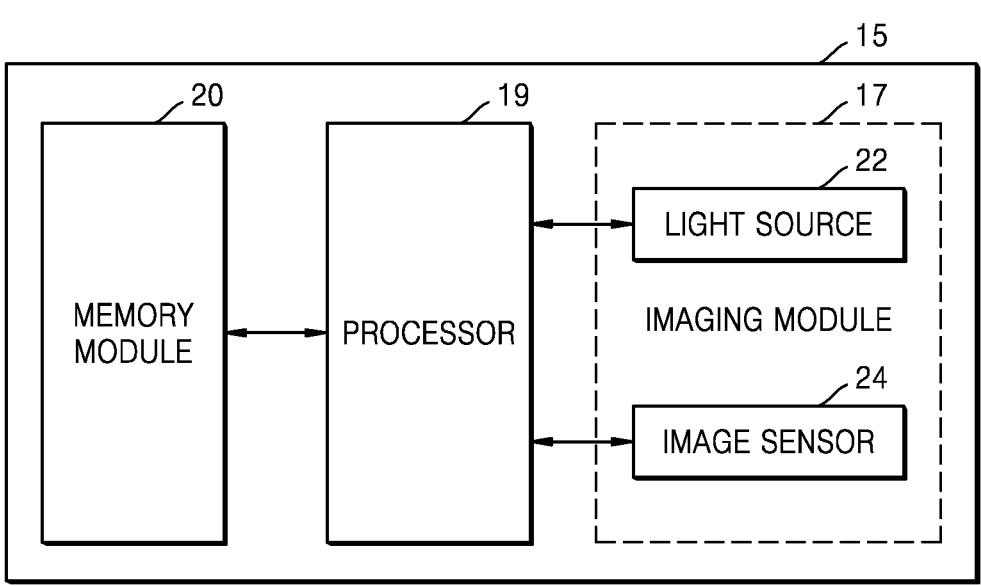
FIG. 1 is a schematic block diagram of a system according to an embodiment.

FIG. 1 is a schematic block diagram of a system according to an embodiment.

Referring to FIG. 1, a system 15 may include an imaging module 17 which communicates with and is connected to a processor 19 or a host. The system 15 may further include a memory module 20 which is connected to the processor 19 and which stores information such as, for example, image data received from the imaging module 17. In an embodiment, the system 15 may be integrated in one semiconductor chip. In an embodiment, the imaging module 17, the processor 19, and the memory module 20 may each be implemented as a separate individual semiconductor chip. In an embodiment, the memory module 20 may include one or more memory chips. In an embodiment, the processor 19 may include multi-processing chips.

The system 15 may include a low power electronic device for application of an image sensor for distance measurement, according to an embodiment. The system 15 may be portable or stationary. Examples of portable forms of the system 15 may include a mobile device, a mobile phone, a smartphone, user equipment (UE), a tablet, a digital camera, a laptop or desktop computer, an electronic smartwatch, a machine-to-machine (M2M) communication device, a virtual reality (VR) device or module, a robot, etc. Examples of stationary forms of the system 15 may include a video game console, a reciprocal video terminal, an automobile, a machine vision system, an industrial robot, a virtual reality (VR) device, a camera embedded on the driver's side in an automobile, etc.

In an embodiment, the imaging module 17 may include a light source 22 and an image sensor 24. The light source 22 may include, for example, a laser diode (LD) or a light-emitting diode (LED), a near infrared (IR) (NIR) ray laser, a point light source, a monochromatic light source combined with a white lamp and a monochromator, or a combination of other laser light sources. In an embodiment, the light source 22 may emit IR light having a wavelength of about 800 nm to about 1000 nm. The image sensor 24 may include a pixel array and auxiliary processing circuits.

In an embodiment, the processor 19 may include a central processing unit (CPU), which is a general purpose processor. In an embodiment, the processor 19 may further include a micro-controller, a digital signal processor (DSP), a graphics processing unit (GPU), a dedicated application specific integrated circuit (ASIC), etc. In addition, the processor 19 may include one or more CPUs which operate in a distributed processing environment. In an embodiment, the processor 19 may include a system on chip (SoC) having functions in addition to functions of the CPU.

The memory module 20 may include, for example, dynamic random-access memory (RAM) (DRAM) such as synchronous DRAM (SDRAM), and a DRAM-based three-dimensional (3D) stack (3DS) memory module such as a high bandwidth memory (HBM) module or a hybrid memory cube (HMC) memory module. The memory module 20 may include a semiconductor-based storage such as a solid state drive (SSD), a DRAM module, static RAM (SRAM), phase-change RAM (PRAM), resistive RAM (RRAM), conductive-bridging RAM (CBRAM), magnetic RAM (MRAM), and spin-transfer torque MRAM (STT-MRAM).

Figure 2:
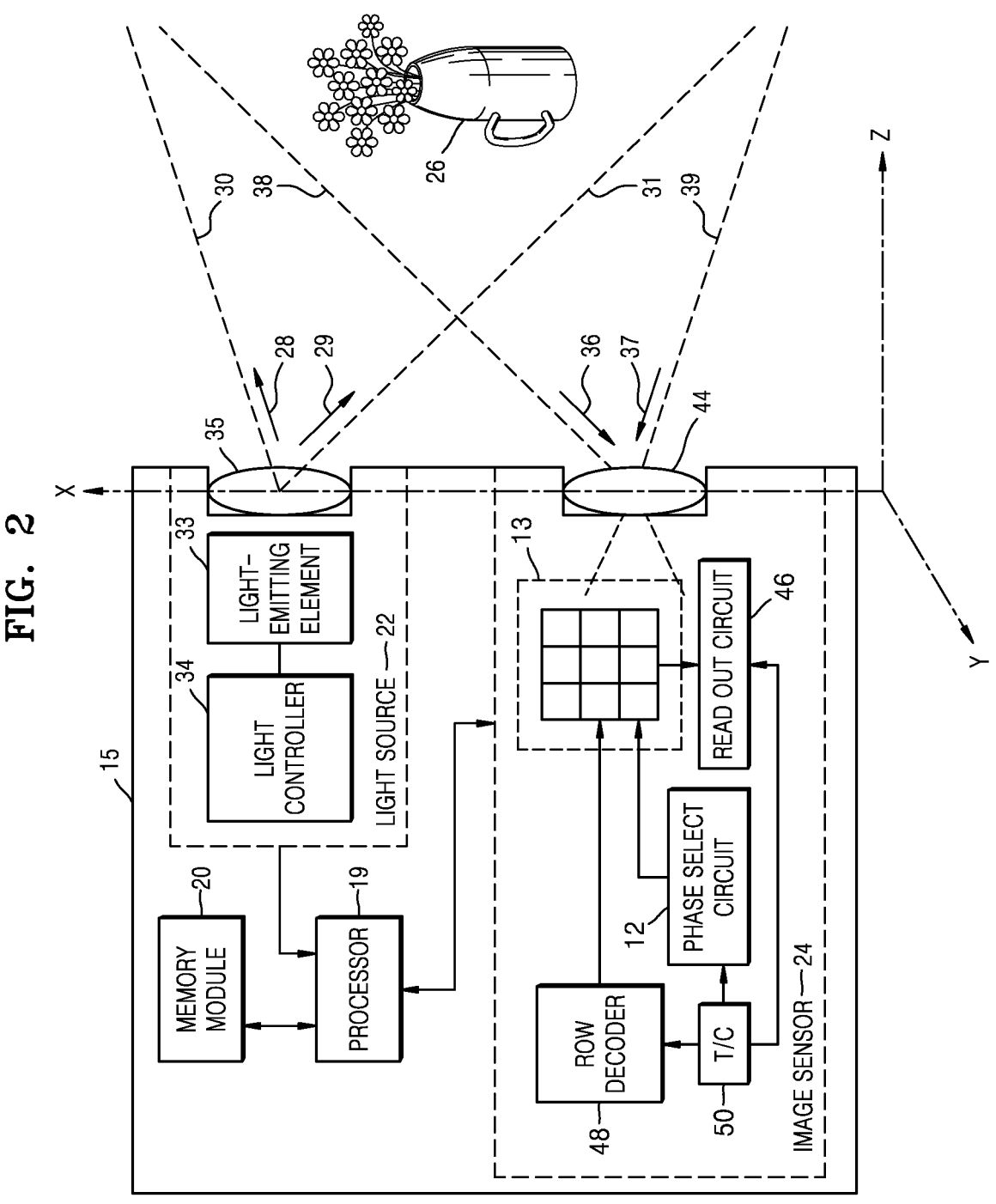
FIG. 2 is a configuration diagram for describing an example operation of a system, according to an embodiment.

FIG. 2 is a configuration diagram for describing an example operation of a system, according to an embodiment.

Referring to FIG. 2, the system 15 may be used to obtain depth information about an object, or distance information in the Z-axis about a 3D object 26, which is an individual object or an object in a scene. In an embodiment, the depth information may be computed by the processor 19 based on scan data received from the image sensor 24, or may be computed autonomously by the image sensor 24. In an embodiment, the depth information may be used as a portion of a 3D user interface by the processor 19, and may allow a user of the system 15 to interact with a 3D image of the 3D object 26 as a portion of another application executed by a game or in the system 15, or to use the 3D image of the 3D object 26.

The X-axis may be a horizontal direction along a front side of the system 15, the Y-axis may be a vertical direction away from the page, and the Z-axis may extend in a direction of the object 26 to be imaged by the system 15. Optical axes of the light source 22 and the image sensor 24 may be in parallel with the Z-axis for depth measurement.

The light source 22 may irradiate the 3D object 26 with transmitted light beams 28 and 29 as illustrated by arrows. The transmitted light beams 28 and 29 may be respectively emitted along light beam irradiation paths 30 and 31.

A projection lens 35 may include a cylindrical optical element that concentrates the transmitted light beams 28 and 29 from a concentration lens or a light-emitting element 33 at a point on a surface of the 3D object 26. For example, the projection lens 35 may include a concentration lens having a convex structure. However, the projection lens 35 is not limited thereto. For example, in an embodiment, another type of a suitable lens design may be selected for the projection lens 35.

In an embodiment, the light-emitting element 33 may include, for example, an LD or an LED for emitting IR rays or visible light, an NIR ray laser, a point light source, a monochromatic light source combined with a white lamp and a monochromator, or a combination of other laser light sources. The light-emitting element 33 may be fixed at one position inside a housing of the system 15, and may be rotatable in the X- and Y-axes directions. The light-emitting element 33 may be controlled in the X- and Y-axes directions by a light controller 34, and may perform a point scan of the 3D object 26.

Reflected light beams 36 and 37 reflected by the 3D object 26 may respectively travel along light beam concentration paths 38 and 39. As the reflected light beams 36 and 37 are received along the light beam concentration paths 38 and 39, photons, which are scattered by or reflected by a surface of the 3D object 26, may move. In FIG. 2, various paths illustrated by arrows and dashed lines are illustrated as examples. However, paths along which actual light signals move are not limited to the paths illustrated in FIG. 2.

The reflected light beams 36 and 37 received from the irradiated 3D object 26 may be collected on a pixel array 13 via a collection lens 44 of the image sensor 24. Similar to the projection lens 35, the collection lens 44 may include a collection lens or another cylindrical optical element on a glass surface or a plastic surface for concentrating the reflected light beams 36 and 37 received from the 3D object 26 onto the collection lens 44. In an embodiment, the collection lens 44 may include a collection lens having a convex structure. However, the collection lens 44 is not limited thereto.

The image sensor 24 may obtain the depth information that is the distance information about the 3D object 26 by using Time-of-Flight (ToF). Phase difference of the reflected light beams 36 and 37 with respect to the transmitted light beams 28 and 29 may correspond to the ToF. The image sensor 24 may obtain the depth information about the 3D object 26 by calculating the phase difference.

The pixel array 13 may include a plurality of pixels. A structure of each of the plurality of pixels is described in detail with reference to FIG. 3. In an embodiment, each of the plurality of pixels may include a depth sensor pixel operating in a TOF manner. For convenience of description, the pixel array 13 of FIG. 2 is illustrated as a 3×3 matrix. However, the number of pixels included in the pixel array 13 is not limited thereto, and may vary. In addition, the pixel array 13 according to an embodiment may include any pixel array operating in the TOF manner, and may exemplarily include a pixel array operation in an indirect (i) TOF and a direct (d) dTOF manner.

The pixel array 13 may include a red-green-blue (RGB) pixel array in which different pixels collect different colors of light beams. The pixel array 13 may include, for example, a two-dimensional (2D) RGB sensor including an IR cutoff filter, a 2D IR sensor, a 2D near (N) IR (NIR) sensor, a 2D RGB white (W) (RGBW) sensor, a 2D RGB-IR sensor, etc. The system 15 may use the same pixel array 13 not only for 3D imaging (including the depth measurement), but also for imaging 2D RGB color (or a scene containing an object) of the 3D object 26.

The pixel array 13 may convert the received reflected light beams 36 and 37 into corresponding electrical signals, that is, pixel signals, and the pixel signals may be processed by a read out circuit 46 to determine a 3D depth image of the 3D object 26. The read out circuit 46 may generate image data based on the pixel signals output by the pixel array 13. For example, the read out circuit 46 may include an analog-to-digital converter for performing an analog-to-digital conversion on the pixel signals, and may include an image signal processor (ISP), which processes digital pixel signals into which the pixel signals have been converted, and calculates distance information (or the depth information). In an embodiment, the ISP may be separately arranged outside the image sensor 24.

A timing controller (T/C) 50 may control components of the image sensor 24 (for example, the read out circuit 46, a phase select circuit 12, and/or a row decoder 48. The phase select circuit 12 may generate control signals and transmit the generated control signals to the pixel array 13 according to the control of the T/C 50. The control signal may include a signal for controlling each of the transistors included in each pixel. The control signals are described in detail with reference to FIG. 3.

The phase select circuit 12 may generate clock signals for controlling transmission transistors included in each of the pixels. The phase select circuit 12 may include a plurality of delay circuit cells, and the plurality of delay circuit cells may be arranged in at least one group to form a loop. Each pixel of the pixel array 13 may receive a delay clock signal from a delay circuit cell of a corresponding phase select circuit 12, and when the plurality of delay circuit cells corresponds to each pixel, each pixel may receive the delay clock signal from one of the plurality of delay circuit cells. A pixel of the pixel array 13 receiving the delay clock signal from a delay circuit cell of a corresponding phase select circuit 12 may be referred to as an object pixel. In an embodiment, the phase select circuit 12 may output delay clock signals of different phases from each other to an object pixel in response to different integration times from each other in a frame, as described in further detail below. According to an embodiment, the plurality of delay circuit cells may form a loop by including a plurality of delay locked loop (DLL) circuits.

The image sensor 24 according to the inventive concept may receive a delay clock signal of a different phase for each integration time from at least one delay circuit cell corresponding to each pixel as a photo gate signal, and each pixel may receive all delay clock signals generated by the phase select circuit 12 during the total integration time of a frame. Accordingly, compared to the case in which each pixel selectively receives only some of the delay clock signals that are generated by the phase select circuit 12, certain depth noise may occur for all pixels. A configuration of the phase select circuit 12 is described later in detail with reference to FIGS. 6 through 18B.

Hereinafter, a delay clock signal generated by each delay circuit cell may be applied to each pixel of a pixel array as a photo gate signal. However, the inventive concept is not limited thereto. For example, in an embodiment, the photo gate signal may be applied in units of columns or rows of the pixel array. A target pixel may mean one pixel unit. However, a target pixel is not limited thereto. For example, in an embodiment, a target pixel may mean a target pixel column or a target pixel row including a plurality of pixels.

The row decoder 48 may decode a plurality of row control signals output by the timing controller 50, and according to a decoding result, may drive the plurality of pixels included in the pixel array 13 in row units. The row decoder 48 may be, for example, a row driver.

The processor 19 may control operations of the light source 22 and the image sensor 24. For example, the system 15 may be controlled by a user, but may include a mode switch for switching between a 2D imaging mode and a 3D imaging mode. When the user selects the 2D imaging mode by using the mode switch, the processor 19 may activate the image sensor 24, and because the 2D imaging mode uses ambient light, in an embodiment, the processor 19 does not activate the light source 22.

When the user selects the 3D imaging mode by using the mode switch, the processor 19 may activate both the light source 22 and the image sensor 24. Processed image data received from a read out circuit 46 may be stored in the memory module 20 by the processor 19. The processor 19 may display the 2D image or the 3D image selected by the user on a display screen of the system 15. The processor 19 may be programmed with software or firmware to perform various processing tasks. In an embodiment, the processor 19 may include programmable hardware logic circuits for performing some or all of the functions described above. For example, the memory module 20 may store program code, look-up tables, or intermediate operation results so that the processor 19 performs corresponding functions.

Figure 3:
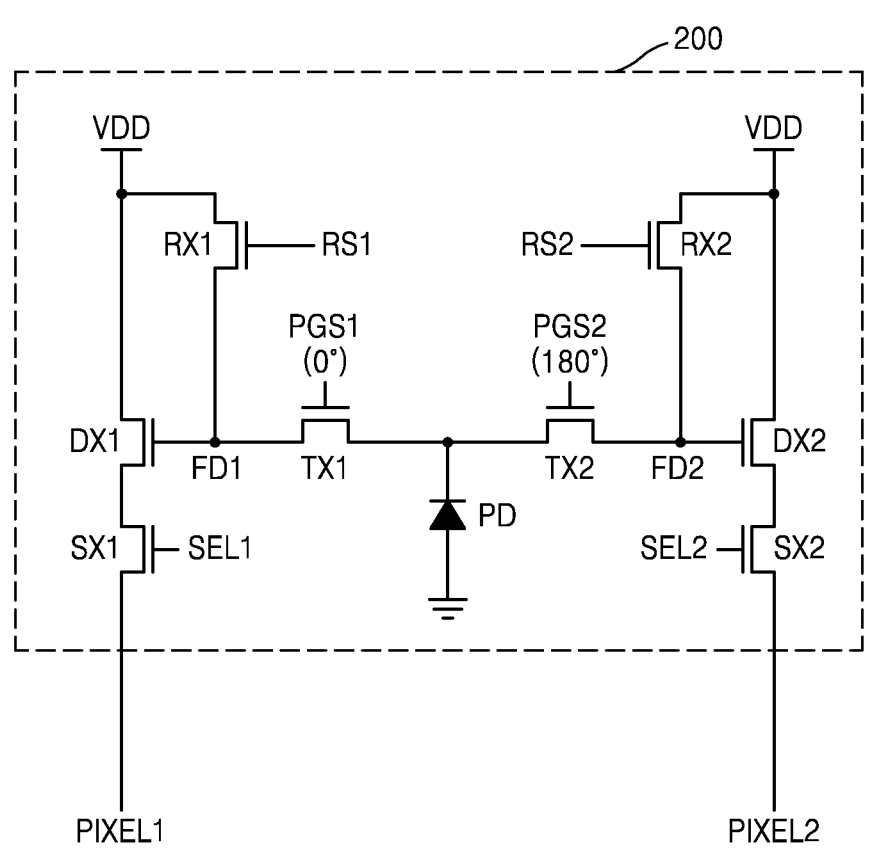
FIG. 3 is a diagram of an example of a structure of a pixel illustrated in FIG. 2, according to an embodiment.

FIG. 3 is a diagram of an example of a structure of a pixel illustrated in FIG. 2, according to an embodiment.

Referring to FIG. 3, each of a plurality of pixels 200 may include a photodiode PD, a first transmission transistor TX1 and a second transmission transistor TX2, a first reset transistor RX1 and a second reset transistor RX2, a first drive transistor DX1 and a second drive transistor DX2, and a first select transistor SX1 and a second select transistor SX2. According to an embodiment, at least one of the first and second reset transistors RX1 and RX2, the first and second drive transistors DX1 and DX2, and the first and second selection transistors SX1 and SX2 may be omitted.

The photodiode PD may generate a photoelectric charge that varies depending on the intensity of the reflected light beams (for example, the reflected light beams 36 and 37 in FIG. 2). In other words, the reflected light beams 36 and 37 may be converted into electrical signals. The photodiode PD, as an example of a photoelectric conversion element, may include at least one of a photo transistor, a photo gate, a pinned photodiode (PPD), or a combination thereof.

The first transmission transistor TX1 and the second transmission transistor TX2 may transmit the generated photoelectric charge to a first floating diffusion node FD1 and a second floating diffusion node FD2 according to a first photo gate signal PGS1 and a second photo gate signal PGS2 output by a photo gate controller, respectively. The first photo gate signal PGS1 and the second photo gate signal PGS2 may include clock signals that have the same frequency, but different phases from each other.

The first transmission transistor TX1 and the second transmission transistor TX2 may, when the first photo gate signal PGS1 and the second photo gate signal PGS2 are at a high level, transmit the photoelectric charge generated by the photodiode PD to the first floating diffusion node FD1 and the second floating diffusion node FD2, respectively. On the other hand, in an embodiment, the first transmission transistor TX1 and the second transmission transistor TX2 do not transmit the photoelectric charge generated by the photodiode PD to the first floating diffusion node FD1 and the second floating diffusion node FD2, respectively, when the first photo gate signal PGS1 and the second photo gate signal PGS2 are at a low level.

Each of the plurality of pixels 200 may have a two-tap pixel structure. The two-tap pixel structure may be referred to as a structure in which one pixel includes two taps. In this case, the tap may denote a unit component that is capable of categorizing per phase and transmit photoelectric charges that are generated and accumulated inside a pixel by using irradiation of external light. A transmission method for the pixel may be implemented by using two taps: one tap for about a 0-degree phase and about a 180-degree phase, and another tap for about a 90-degree phase and about a 270-degree phase. For example, one pixel may include a first tap unit including the first transmission transistor TX1, the first reset transistor RX1, the first drive transistor DX1, and the first select transistor SX1, and a second tap unit including the second transmission transistor TX2, the second reset transistor RX2, the second drive transistor DX2, and the second select transistor SX2. The first tap unit may include a unit configured to transmit for the about 0-degree phase, and the second tap unit may include a unit configured to transmit for the about 180-degree phase. Alternatively, the first tap unit may include a unit configured to transmit for the about 90-degree phase, and the second tap unit may include a unit configured to transmit for the about 270-degree phase.

To calculate the phase difference between the reflected light beams 36 and 37 with respect to transmitted light beams (for example, the transmitted light beans 28 and 29 in FIG. 2), the first transmission transistor TX1 and the second transmission transistor TX2 may be provided with clock signals which have a constant frequency and a phase difference of about 90 degrees from each other. In other words, the first photo gate signal PGS1 and the second photo gate signal PGS2 of the same frequency as the transmission light and different phases from each other may be provided to the first transmission transistor TX1 and the second transmission transistor TX2.

In an embodiment, in a first period, the first photo gate signal PGS1 may include a clock signal of a phase of about 0 degrees, and the second photo gate signal PGS2 may include a clock signal of a phase of about 180 degrees with respect to the first photo gate signal PGS1. In addition, in a second period following the first period, the first photo gate signal PGS1 may include a clock signal of a phase of about 90 degrees, and the second photo gate signal PGS2 may include a clock signal of a phase of about 270 degrees with respect to the first photo gate signal PGS1.

In an embodiment, the first photo gate signal PGS1, which is provided to a portion of the plurality of pixels 200, may include a clock signal of a phase of about 0 degrees, and the second photo gate signal PGS2 may have a phase of about 180 degrees with respect to the first photo gate signal PGS1. On the other hand, the first photo gate signal PGS1, which is provided to the other portion of the plurality of pixels 200, may include a clock signal of a phase of about 90 degrees, and the second photo gate signal PGS2 may have a phase of about 270 degrees with respect to the first photo gate signal PGS1.

In FIG. 3, a pixel of a two-tap structure is illustrated. However, the inventive concept is not limited thereto. For example, in an embodiment, an image sensor 24 may include pixels having a 4-tap structure. In the case of a 4-tap structure pixel, 4 transmission transistors may be included, and 4 photo gate signals of a phase difference of about 90 degrees with each other (for example, about 0 degrees, about 90 degrees, about 180 degrees, and about 270 degrees) may be provided to the four transmission transistors. The tap structure is not limited to the 2-tap structure or the 4-tap structure, but rather, according to embodiments, may include pixels having a 3-tap structure, or other multi-tap structure.

According to an embodiment, the photogate signal PSG (e.g., PSG1, PSG2) received by at least some of the plurality of pixels 200 may include a signal shifted by a certain phase difference compared to a reference clock signal or the photogate signal PSG applied to the other pixels, and each of the pixels 200 may reduce the load of a voltage regulator of the image sensor 24 by dispersing a peak current by receiving photogate signals PSG of different phases from each other.

According to a voltage potential by photoelectric charges accumulated in the first floating diffusion node FD1 and the second floating diffusion node FD2, the first drive transistor DX1 and the second drive transistor DX2 may amplify and transmit the photoelectric charges to the first select transistor SX1 and the second select transistor SX2, respectively.

The first and second select transistors SX1 and SX2 may be connected to source terminals of the first and second drive transistors DX1 and DX2, respectively, and in response to each of the first and second selection control signals SEL1 and SEL2 output by the photo gate controller, the first and second select transistors SX1 and SX2 may output first and second pixel signals PIXEL1 and PIXEL2 to a read out circuit (for example, the read out circuit 46 in FIG. 2) via column lines, respectively. Each of the plurality of pixels

200 may accumulate the photoelectric charges for a certain time period, for example, for an integration time, and output pixel signals generated according to an accumulation result.

The first and second reset transistors RX1 and RX2 may reset first and second diffusion nodes FD1 and FD2 to a power voltage VDD according to first and second reset control signals RS1 and RS2 output by the photo gate controller, respectively. In an embodiment, a row driver (for example, 48 in FIG. 2) may generate control signals RS1, RS2, SEL1, and SEL2 provided to the plurality of pixels 200 according to the control of the T/C 50.

Figure 4:
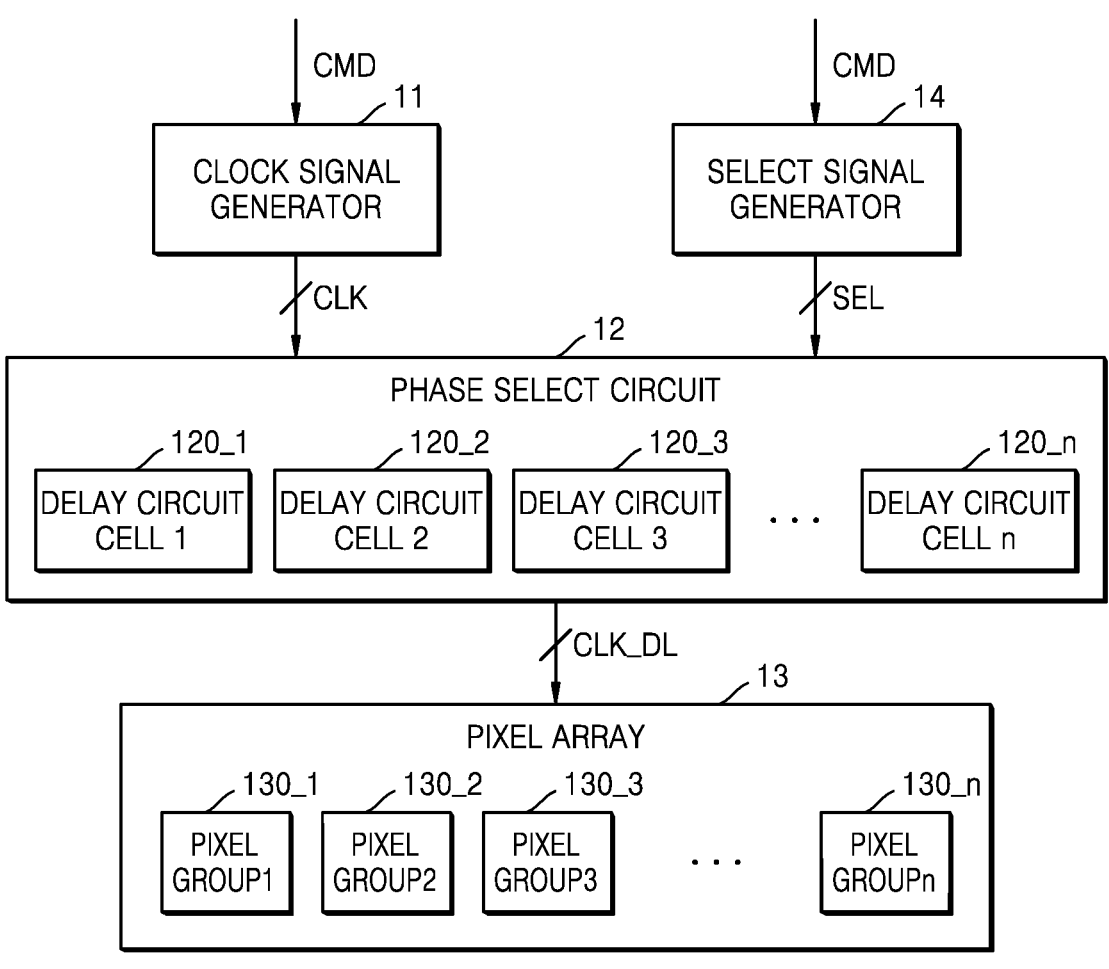
FIG. 4 is a block diagram of a schematic configuration of an image sensor, according to an embodiment.

FIG. 4 is a block diagram of a schematic configuration of an image sensor, according to an embodiment.

Referring to FIG. 4, the image sensor may include a clock signal generator 11, the phase select circuit 12, the pixel array 13, and a select signal generator 14. The clock signal generator 11 may generate a reference clock signal CLK in response to a command CMD received from a host device or a controller device. The command CMD may be used to generate a photo gate signal. The image sensor of FIG. 4 and the controller device that generates the command CMD for generating the photo gate signal may be collectively referred to as an image sensor clock generator. The reference clock signal CLK may have the same frequency as the transmission light beam (for example, the transmitted light beams 28, 29, 30, and 31 in FIG. 2). The reference clock signal CLK may have four clock signals of phases of about 0 degrees, about 90 degrees, about 180 degrees, and about 270 degrees, respectively. According to an embodiment, a difference between phases is not limited to a quadrature phase difference, and the number of phases used or the difference between phases may vary according to a pixel structure. Descriptions of the drawings below are given based on a clock signal of a phase of about 0 degrees, but the descriptions below may be equally applied to clock signals of phases of about 90 degrees, about 180 degrees, and about 270 degrees.

The phase select circuit 12 may generate a plurality of delay clock signals CLK_DL based on the reference clock signal CLK generated by the clock signal generator 11, and may provide the generated plurality of delay clock signals CLK_DL to at least some pixels of the pixel array 13. Referring to FIG. 4, the plurality of delay clock signals CLK_DL may be provided to each of the columns of the pixel array 13. However, the inventive concept is not limited thereto. For example, in an embodiment, the plurality of delay clock signals CLK_DL may be provided to a pixel group 130_1, 130_2, 130_3, and 130_n of each of the rows, in which n is a natural number.

The phase select circuit 12 may include a plurality of delay circuit cells 120_1, 120_2, 120_3, and 120_n, and each delay circuit cell 120 may generate delay clock signals CLK_DL of different phases for each light collection time. For example, when a first delay clock signal is generated during a first integration time, a delay clock signal different from the first delay clock signal may be generated during a second integration time.

In addition, each of the plurality of delay circuit cells 120 may generate the delay clock signals CLK_DL of phases different from those of the other delay circuit cells 120 during each integration time. For example, when the first delay circuit cell 120_1, 120_2, 120_3, and 120_n generates the first delay clock signal during the first integration time, the second delay circuit cell 120_1, 120_2, 120_3, and 120_n different from the first delay circuit cell 120_1, 120_2, 120_3, and 120_n may generate a delay clock signal different from the first delay clock signal. In other words, the plurality of delay circuit cells 120_1, 120_2, 120_3, and 120_n may generate the delay clock signals CLK_DL of different phases during the same integration time, and the same delay circuit cell 120_1, 120_2, 120_3, and 120_n may generate the delay clock signals CLK_DL of different phases during each of the plurality of integration times.

In the pixel array 13, a plurality of columns and a plurality of rows may be arranged in a matrix form, and pixels may be arranged at a point where each column and each row intersect each other. Each pixel of the pixel array 13 may receive the reference clock signal CLK or the delay clock signal CLK_DL as a photo gate signal, and may receive an optical signal in synchronization with the photo gate signal. The pixel array 13 may include a plurality of pixel groups 130_1, 130_2, 130_3, and 130_n, and each pixel group 130_1, 130_2, 130_3, or 130_n may perform a integration operation in response to the delay clock signal CLK_DL generated from delay circuit cells 120_1, 120_2, 120_3, and 120_n different from each other. For example, each pixel group 130_1, 130_2, 130_3, or 130_n may be connected to the same column, and the first pixel group 130_1 connected to the first column may perform a integration operation in response to the first delay clock signal CLK_DL1 generated by the first delay circuit cell 120_1. However, the pixel groups 130_1, 130_2, 130_3, and 130_n of embodiments are not limited to the pixel group corresponding to a column, but may also mean the pixel group corresponding to a row or the pixel group corresponding to an area of the pixel array 13.

The select signal generator 14 may provide a select signal SEL to the phase select circuit 12 in response to the command CMD received from the host device or the controller device. The select signal generator 14 may apply a plurality of select signals SEL to a plurality of delay circuit cells 120_1, 120_2, 120_3, and 120_n, and each delay circuit cell 120_1, 120_2, 120_3, or 120_n may determine whether to generate the delay clock signal CLK_DL of the certain phase difference from the reference clock signal CLK according to a logic state of the select signal SEL or to generate the delay clock signal CLK_DL of the certain phase difference from an output signal of the adjacent delay circuit cell. For example, the first delay circuit cell 120_1 may receive the select signal SEL of a first level from the select signal generator 14, and in response to the select signal SEL of the first level, the first delay circuit cell 120_1 may generate the delay clock signal CLK_DL delayed by a certain phase from the reference clock signal CLK. In this case, the select signal generator 14 may provide the select signal SEL of a second level to the delay circuit cells 120_2, 120_3, and 120_n except for the first delay circuit cell 120_1, and each delay circuit cell 120_2, 120_3, and 120_n may generate the delay clock signal CLK_DL delayed by a certain phase from an output signal of the adjacent delay circuit cell.

Figure 5:
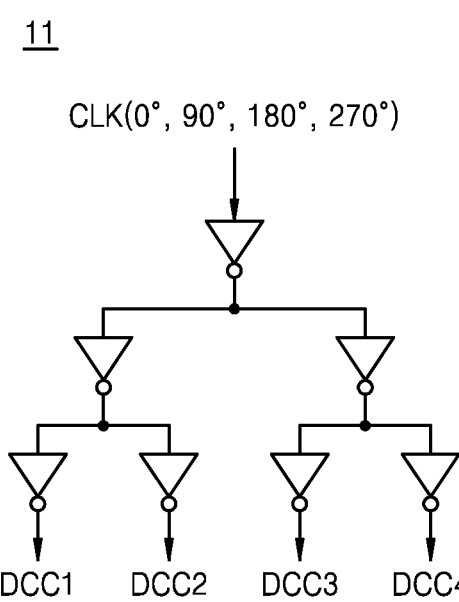
FIG. 5 is a circuit diagram of a clock signal generator according to an embodiment.

FIG. 5 is a circuit diagram of the clock signal generator 11 according to an embodiment.

Hereinafter, an embodiment is described in which the phase select circuit 12 generates four delay clock signals and provides the delay clock signals to each of four different pixel groups 130_1, 130_2, 130_3, and 130_n. However, in the inventive concept, the number of delay circuit cells and the number of pixel groups 130_1, 130_2, 130_3, and 130_n providing the delay clock signals are not limited thereto.

Referring to FIG. 5, the clock signal generator 11 may provide the reference clock signal CLK to each of the four delay circuit cells DCC1, DCC2, DCC3, and DCC4. The reference clock signal CLK received by the clock signal generator 11 may include one of four clock signals of a phase of about 0 degrees, about 90 degrees, about 180 degrees, and about 270 degrees. According to an embodiment, the clock signal generator 11 may receive one reference clock signal CLK, and provide the received one reference clock signal CLK to a buffer of a next level via buffers having the same specifications. In other words, the clock signal generator 11 may include a buffer tree including a plurality of buffers, and may provide the reference clock signal CLK of the same phase to the plurality of delay circuit cells DCC1 through DCC4.

Figure 6:
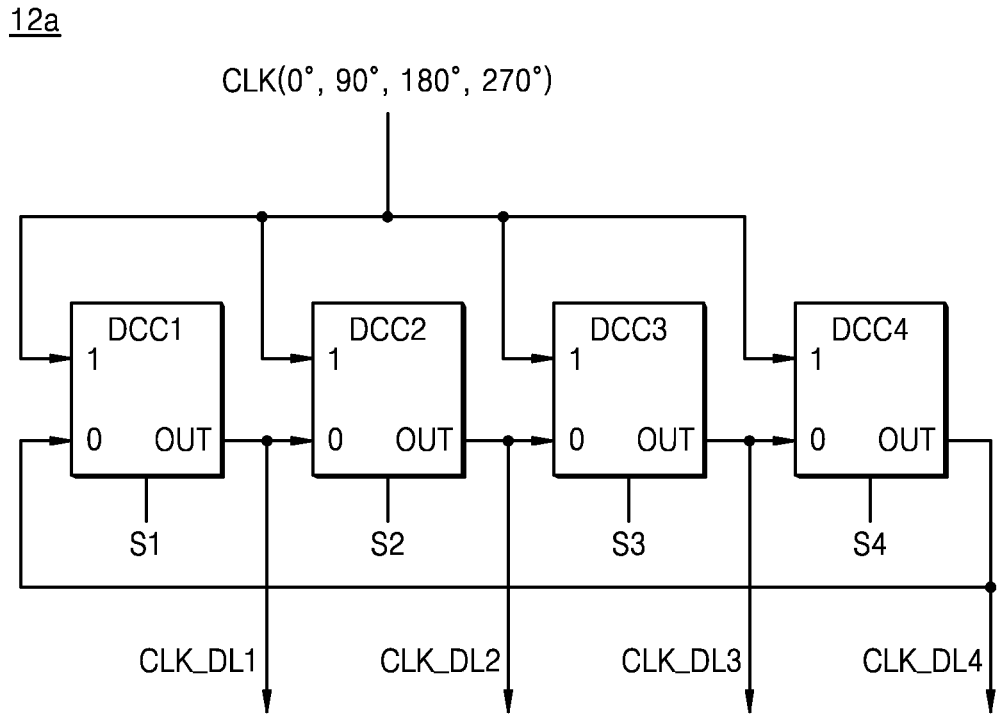
FIG. 6 is a circuit diagram of a phase select circuit outputting four delayed clock signals, according to an embodiment.

FIG. 6 is a circuit diagram of a phase select circuit 12a outputting four delay clock signals, according to an embodiment.

Referring to FIG. 6, the phase select circuit 12a may include four delay circuit cells DCC1, DCC2, DCC3, and DCC4, and the delay circuit cells DCC1 through DCC4 may respectively receive reference clock signals CLK of the same phase generated according to FIG. 5. In addition, each delay circuit cell may receive a signal output from another delay circuit cell. For example, the delay circuit cell may receive a signal output from an adjacent circuit cell. The adjacent delay circuit cell may include a delay circuit cell located on the left or right side of a target delay circuit cell, and an adjacent circuit cell of the delay circuit cell arranged on the leftmost side of the target delay circuit cell may include a delay circuit cell arranged on the rightmost side of the target delay circuit cell. According to FIG. 6, the target delay circuit cell may receive an output signal from the delay circuit cell located on the left side, but the inventive concept is not limited thereto.

Each delay circuit cell may receive different select signals from each other, and according to a logic state of the received select signal, may output a delay clock signal of a first type delayed by a certain phase from the reference clock signal CLK or a delay clock signal of a second type delayed by a certain phase from the output signal of another delay circuit cell. For example, in response to the case in which the logic state of a select signal is logic high, the delay circuit cell may output the delay clock signal of the first type, and in response to the case in which the logic state of a select signal is logic low, the delay circuit cell may output the delay clock signal of the second type. Although it has been described that the delay circuit cell outputs a signal delayed by a certain phase from the reference clock signal CLK in response receiving the select signal of a logic high level, the inventive concept is not limited thereto.

According to an embodiment, the select signal generator 14 may provide the select signal of the first level commanding only one delay circuit cell of the four delay circuit cells DCC1 through DCC4 included in the phase select circuit 12 to generate the delay clock signal of the first type, and the select signal generator 14 may provide the select signal of the second level to the other delay circuit cells so that the other delay circuit cells, except for the delay circuit cell that has received the select signal of the first level, generate the delay clock signal of the second type.

For example, the first delay circuit cell DCC1 may generate the first delay clock signal CLK_DL1 of the first type delayed by a certain phase from the reference clock signal CLK in response to receiving a first select signal S1 of the first level, and the second delay circuit cell DCC2, the third delay circuit cell DCC3, and the fourth delay circuit cell DCC4 excluding the first delay circuit cell DCC1 may receive second through fourth select signals S2, S3, and S4 of the second level. In this case, the second delay circuit cell DCC2 that has received the select signal of the second level may generate a second delay clock signal CLK_DL2 of the second type delayed by a certain phase from the first delay clock signal CLK_DL1 of the first delay circuit cell DCC1. Accordingly, the first through fourth delay circuit cells DCC1 through DCC4 may generate first through fourth delay clock signals CLK_DL1, CLK_DL2, CLK_DL3, and CLK_DL4 of phases different from those of other delay circuit cells.

A delay clock signal generated by each of the first through fourth delay circuit cells DCC1 through DCC4 may be applied to pixel groups 130_1, 130_2, 130_3, and 130_4 different from each other, and each pixel group 130_1, 130_2, 130_3, or 130_4 may perform the integration operation by receiving the delay clock signal as the photo gate signal.

Figure 7A:
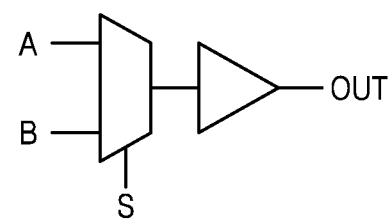
FIGS. 7A and 7B are circuit diagrams of delay circuit cells according to embodiments.
Figure 7B:
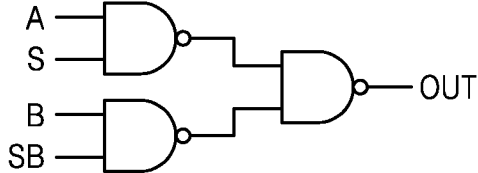

FIGS. 7A and 7B are circuit diagrams of delay circuit cells according to embodiments.

Referring to FIG. 7A, a delay circuit cell 120a may include a multiplexer, and the multiplexer may output any one of two input signals A and B based on a select signal S as an output OUT. According to an embodiment, the multiplexer may select and output the reference clock signal CLK as signal A and any one of the output signals of the other delay circuit cells according to the logic state of the select signal.

Referring to FIG. 7B, a delay circuit cell 120b may include a plurality of NAND gates. A first NAND gate may receive the reference clock signal CLK as signal A and the select signal S, and a second NAND gate may receive an output signal B and an inverted select signal SB of another delay circuit cell. The delay circuit cell 120b including the plurality of NAND gates may output a signal OUT delayed by a certain phase from the reference clock signal CLK in response to the select signal S being logic high, and the delay circuit cell 120b may output a signal OUT delayed by a certain phase from an output signal of another delay circuit cell in response to the select signal S being logic low.

Figure 8:
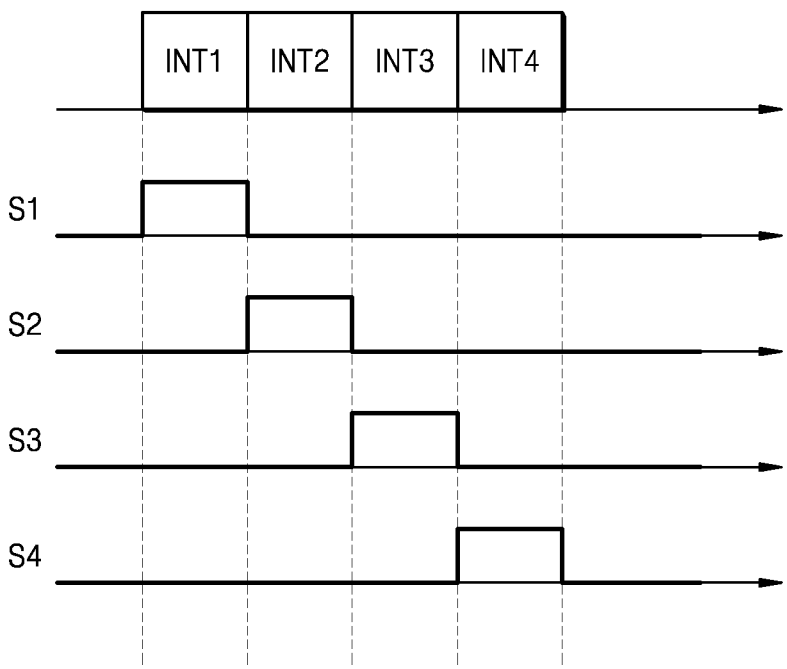
FIG. 8 is a graph of select signals applied to a delay circuit cell for generating different delay clock signals in the embodiment of FIG. 6.

FIG. 8 is a graph of select signals applied to a delay circuit cell for generating different delay clock signals in the embodiment of FIG. 6. FIGS. 9A through 9D are graphs of delay levels of delay clock signals output to the first through fourth integration times INT1, INT2, INT3, and INT4 by the delay circuit cell receiving the select signals of FIG. 8.

Referring to FIG. 8, the select signal generator 14 may provide select signals of logic high to different delay circuit cells for each of the first through fourth integration times INT1 through INT4. For example, the select signal generator 14 may apply the first through fourth select signals S1 through S4 to each of four different delay circuit cells, and when the first select signal S1 of logic high is applied to the first delay circuit cell DCC1, the select signal generator 14 may apply the second through fourth select signals S2 through S4 of logic low to the remaining second through fourth select circuit cells DCC2 through DCC4, respectively. After the select signal generator 14 applies the first through fourth select signals S1 through S4 during the first integration time INT1, the select signal generator 14 may apply the first select signal S1 of logic low to the first delay circuit cell DCC1 during the second integration time INT2. In this case, a select signal of logic high may be applied to any one of the remaining second through fourth delay circuit cells DCC2 through DCC4 except for the first delay circuit cell DCC1, and according to the embodiment of FIG. 8, the second select signal S2 of logic high may be provided to the second delay circuit cell DCC2. In other words, the select signal generator 14 may provide the second select signal S2 of logic high to the second delay circuit cell DCC2 during the second integration time INT2, and may provide the first select signal S1, the third select signal S3, and the fourth select signal S4 of logic low to the remaining first, third, and fourth delay circuit cells DCC1, DCC3, and DCC4. In the same manner, the select signal generator 14 may apply the third select signal S3 of logic high to the third delay circuit cell DCC3 during the third integration time INT3, and may apply the fourth select signal S4 of logic high to the fourth delay circuit cell DCC4 during the fourth integration time INT4. However, the inventive concept is not limited to only the case in which the first through fourth delay circuit cells DCC1 through DCC4 are sequentially provided with select signals of logic high. Rather, embodiments of the inventive concept may include all cases in which different delay circuits from each other receive select signals of logic high during different integration times from each other.

Referring to FIGS. 9A through 9D, the phase select circuit 12 may generate delay clock signals in response to select signals generated by the method described with reference to FIG. 8. The delay circuit cell of the phase select circuit 12 may generate the delay clock signal of the first type of the certain phase difference from the reference clock signal CLK in response to receiving the select signal of the first level, and may generate the delay clock signal of the second type of the certain phase difference from the output signal of other delay circuit cell in response to receiving the select signal of the second level. The delay clock signal of the first type and the delay clock signal of the second type may include clock signals of the same phase difference from the received signal. Hereinafter, it is described that each delay circuit cell generates a delay clock signal delayed by 1 delay unit 1D from the input signal.

Figure 9A:
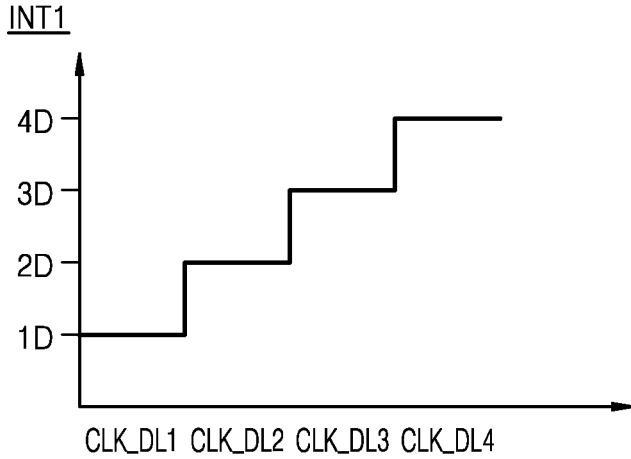
FIGS. 9A, 9B, 9C, and 9D are graphs of delay levels of delay clock signals output to first through fourth integration times by the delay circuit cell receiving the select signals of FIG. 8.

Referring to FIG. 9A, the delay circuit cells may generate the first through fourth delay clock signals CLK_DL1 through CLK_DL4 during the first integration time INT1. Referring to FIGS. 6 and 8, because the first delay circuit cell DCC1 has received the select signal of logic high during the first integration time INT1, the first delay circuit cell DCC1 may generate the first delay clock signal CLK_DL1 delayed by 1 delay unit 1D from the reference clock signal CLK. The second delay circuit cell DCC2 may receive the first delay clock signal CLK_DL1 and the reference clock signal CLK, and according to the logic state of the select signal, may generate a signal delayed by 1 delay unit 1D from any one of the first delay clock signal CLK_DL1 and the reference clock signal CLK as the second delay clock signal CLK_DL2. The second delay circuit cell DCC2 may, by receiving the select signal of logic low, generate a signal delayed by 1 delay unit 1D from the first delay clock signal CLK_DL1 as the second delay clock signal CLK_DL2. Because the first delay clock signal CLK_DL1 is a signal delayed by 1 delay unit 1D from the reference clock signal CLK, the second delay clock signal CLK_DL2 may be a signal delayed by 2 delay units 2D from the reference clock signal CLK. In the same manner, because a third delay clock signal CLK_DL3 receives a select signal of logic low, a signal delayed by 1 delay unit 1D from the second delay clock signal CLK_DL2 may be generated as the third delay clock signal CLK_DL3, and accordingly, the third delay clock signal CLK_DL3 may include a signal delayed by 3 delay units 3D from the reference clock signal CLK. Because a fourth delay clock signal CLK_DL4 receives a select signal of logic low, a signal delayed by 1 delay unit 1D from the third delay clock signal CLK_DL3 may be generated as the fourth delay clock signal CLK_DL4, and accordingly, the fourth delay clock signal CLK_DL4 may include a signal delayed by 4 delay units 4D from the reference clock signal CLK.

Figure 9B:
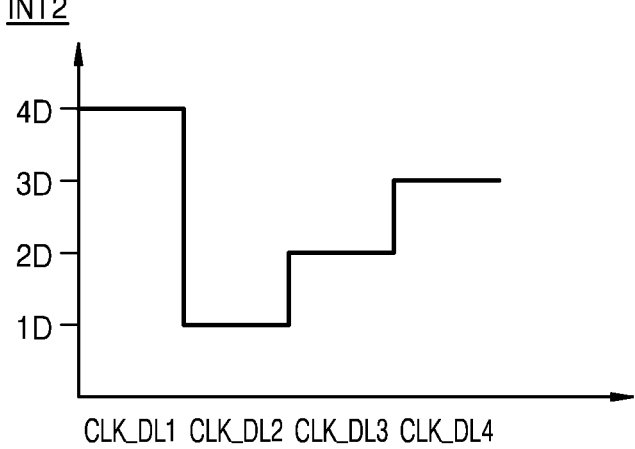

Referring to FIG. 9B, the delay circuit cells may generate the first through fourth delay clock signals CLK_DL1 through CLK_DL4 during the second integration time INT2. Referring to FIGS. 6 and 8, because the second delay circuit cell DCC2 has received the select signal of logic high during the second integration time INT2, the second delay circuit cell DCC2 may generate the second delay clock signal CLK_DL2 delayed by 1 delay unit 1D from the reference clock signal CLK. As described above with reference to FIG. 9A, the first delay circuit cell DCC1, the third delay circuit cell DCC3, and the fourth delay circuit cell DCC4 may, by receiving the select signals of logic low, generate the delay clock signals delayed by 1 delay unit 1D from the output signals of the adjacent delay circuit cells. For example, the third delay circuit cell DCC3 may generate the third delay clock signal CLK_DL3 delayed by 2 delay units 2D from the reference clock signal CLK by generating a clock signal delayed by 1 delay unit 1D from the second delay clock signal CLK_DL2, and the fourth delay circuit cell DCC4 may generate the fourth delay clock signal CLK_DL4 delayed by 3 delay units 3D from the reference clock signal CLK. Referring to FIG. 6, the first delay circuit cell DCC1 may receive the fourth delay clock signal CLK_DL4, and by receiving a select signal of logic low, may generate a clock signal delayed by 1 delay unit 1D from the fourth delay clock signal CLK_DL4 as the first delay clock signal CLK_DL1.

Figure 9C:
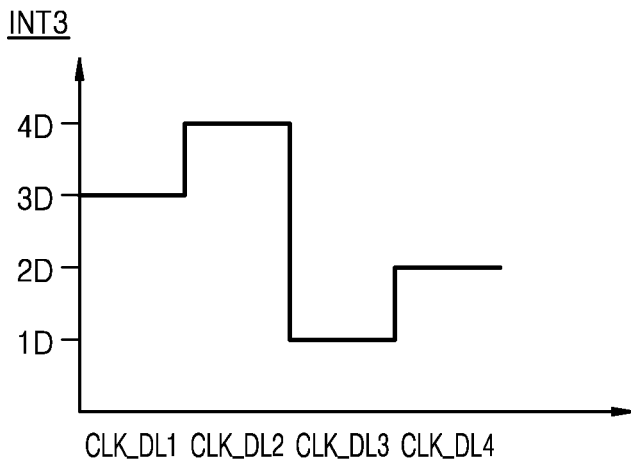
Figure 9D:
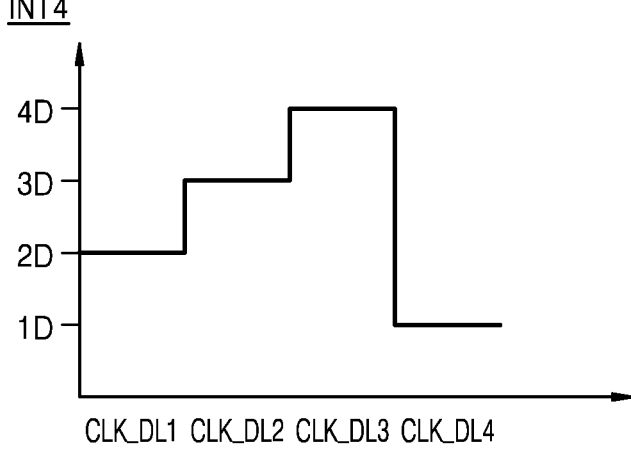

FIGS. 9C and 9D illustrate that a plurality of delay circuit cells generate delayed clock signals delayed by different delay units from each other during the third integration time INT3 and the fourth integration time INT4, respectively. Since the generation of the delay clock signals has been described with reference to FIGS. 9A and 9B, a further detailed description thereof is omitted for convenience of explanation.

Figure 11:
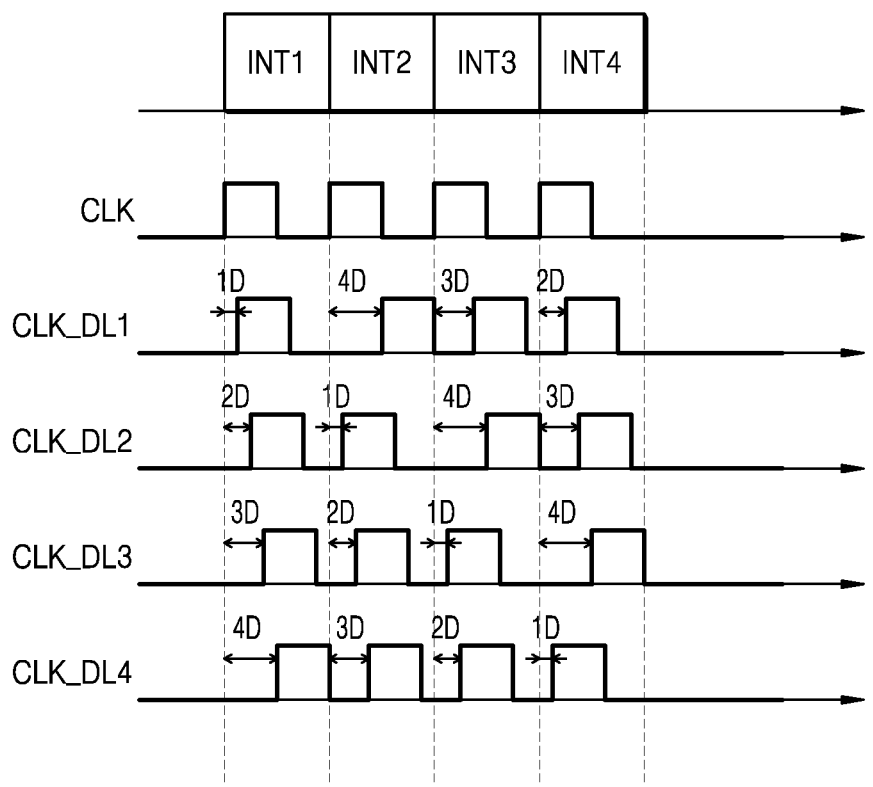
FIG. 11 is a graph of delay clock signals generated for respective integration times.

FIG. 10 is a table of delay levels generated during the first through fourth integration times INT1 through INT4 in FIGS. 9A through 9D. FIG. 11 is a graph of delay clock signals generated during respective integration times.

Referring to FIGS. 6 through 9D, the same delay circuit cell may generate delay clock signals having different delay units from each other from different reference clock signals CLK from each other during different integration times from each other during the total integration time, and each of the plurality of delay circuit cells may generate different delay clock signals from each other during the same integration time.

For example, referring to FIG. 10, the first delay circuit cell DCC1 may, by using the first delay clock signal CLK_DL1, generate a delay clock signal delayed by 1 delay unit 1D from the reference clock signal CLK during the first integration time INT1, and may generate a delay clock signal delayed by 4 delay units 4D from the reference clock signal CLK during the second integration time INT2. In addition, the first delay circuit cell DCC1 may generate delay clock signals which are delayed by 3 delay units 3D from the reference clock signal CLK during the third integration time INT3, and delayed by 2 delay units 2D from the reference clock signal CLK during the fourth integration time INT4.

In addition, during the first integration time INT1, the first delay circuit cell DCC1 may generate a delay clock signal delayed by 1 delay unit 1D, the second delay circuit cell DCC2 may generate a delay clock signal delayed by 2 delay units 2D, the third delay circuit cell DCC3 may generate a delay clock signal delayed by 3 delay units 3D, and the fourth delay circuit cell DCC4 may generate a delay clock signal delayed by 4 delay units 4D, from the reference clock signal CLK.

An image sensor according to an embodiment may generate a pixel signal corresponding to a particular reference clock signal by combining optical signals received in correspondence with each integration time. For example, the image sensor may generate a pixel signal by averaging the light signals received during each integration time. Accordingly, the image sensor may receive optical signals for all delay phases in response to a particular reference clock signal, and combine them to obtain depth information about an object with less error for all pixel groups.

Referring to FIG. 11, the phase select circuit 12 may generate the first through fourth delay clock signals CLK_DL1 through CLK_DL4 having the delay units illustrated in the table of FIG. 10. Because each of delay circuit cells of embodiments of the inventive concept may generate a clock signal at different time point during each integration time, a load of a voltage regulator may be reduced by distributing peak currents of the clock signals. In addition, because each delay circuit cell generates delay clock signals including all delay units, while only integration time points generated during the total integration times are different from each other, the difference in error of depth information generated from each pixel group 130 may be reduced, and accordingly, an image sensor may perform a calibration operation more efficiently.

Figure 12:
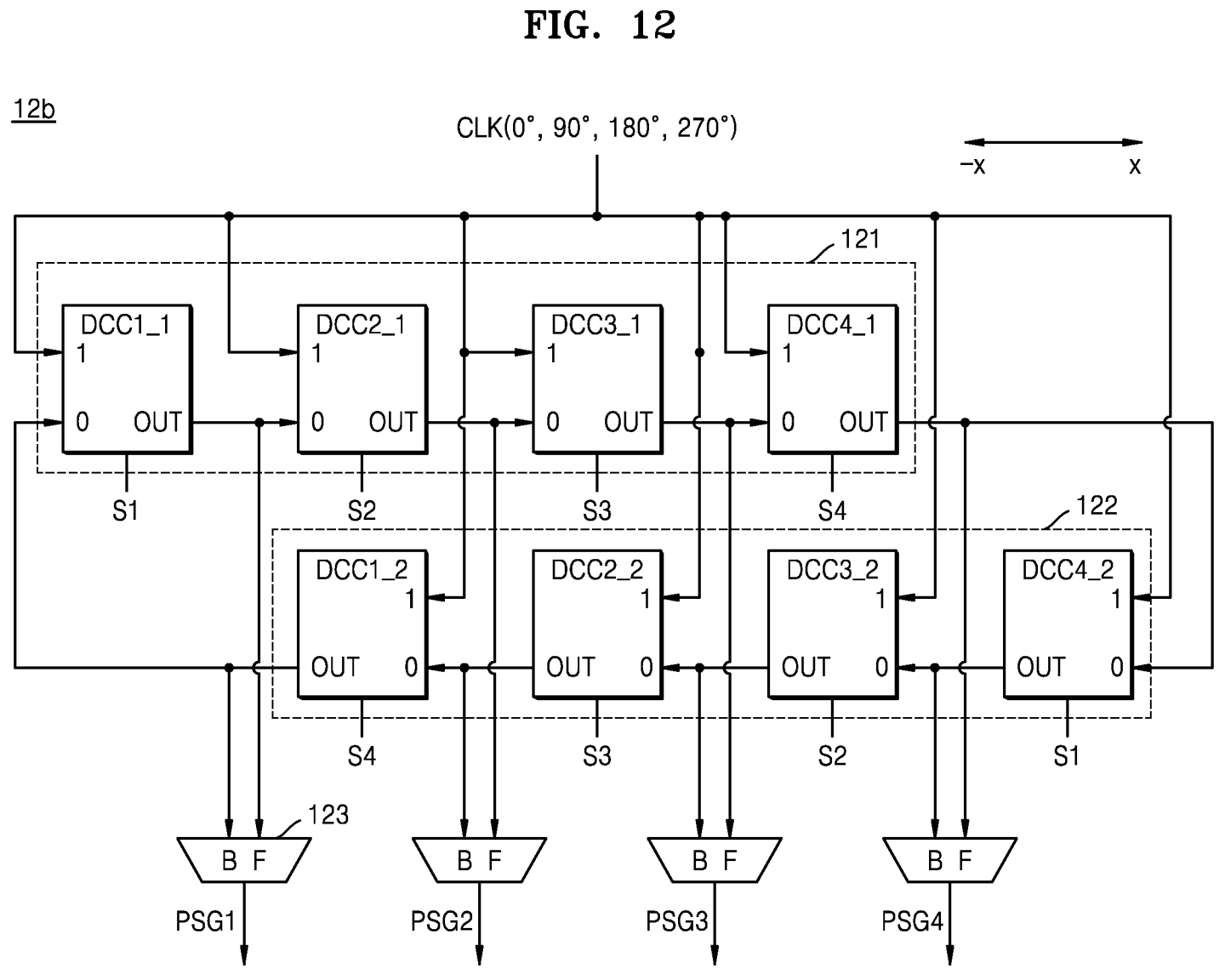

FIG. 12 is a circuit diagram of a phase select circuit 12b including a first delay circuit cell group 121 and a second delay circuit cell group 122.

Referring to FIG. 12, the phase select circuit 12b may include a plurality of delay circuit cells. The plurality of delay circuit cells may be divided into the first delay circuit cell group 121 and the second delay circuit cell group 122. The first delay circuit cell group 121 and the second delay circuit cell group 122 may each include delay circuit cells corresponding to the same pixel group 130. The delay circuit cells may receive the reference clock signal CLK and output signals of other delay circuit cells, and may generate delay clock signals delayed by certain phases from the reference clock signal CLK and output signals of the other delay circuit cells according to select signals respectively input to delay circuit cells.

According to an embodiment, the phase select circuit 12b may output, as a photo gate signal PSG (e.g., PSG1, PSG2, PSG3, PSG4), any one of the delay clock signals generated by the first delay circuit cell group 121 and the second delay circuit cell group 122 in response to the same pixel group 130 (e.g., 130_1, 130_2, 130_3, 130_4). The phase select circuit 12 may include a plurality of selectors 123 corresponding to each pixel group 130, and each selector 123 may receive delay clock signals from the first delay circuit cell group 121 and the second delay circuit cell group 122. The selector 123 may generate the photo gate signal PSG by selecting one of the delay clock signals received from the first delay circuit cell group 121 and the second delay circuit cell group 122 based on the applied indication signal S_FB.

For example, the first delay circuit cell group 121 may include first through fourth forward delay circuit cells DCC1_1 through DCC4_1 which transmit output signals to a delay circuit cell in a forward direction (x direction in FIG. 12), and the second delay circuit cell group 122 may include first through fourth backward delay circuit cells DCC1_2 through DCC4_2 which transmit output signals to a delay circuit cell in a backward direction (in the −x direction in FIG. 12). In response to the first pixel group 130_1, the phase select circuit 12 may include the first forward delay circuit cell DCC1_1 in the first delay circuit cell group 121, and the second delay circuit cell group 122 may include the first backward delay circuit cell DCC1_2. In this case, a first selector may receive a first forward delay clock signal generated by the first forward delay circuit cell DCC1_1, and may receive a first backward delay clock generated by the first backward delay circuit cell DCC1_2. The first selector may provide any one of the first forward delay clock signal DCC1_1 and the first backward delay clock signal DCC1_2 as a first photo gate signal PSG1 to the first pixel group 130_1 according to the logic state of the received indication signal S_FB. In the same manner, second through fourth selectors may provide second through fourth photo gate signals PSG2 through PSG4 to second through fourth pixel groups 130_2 through 130_4 by receiving the second through fourth forward delay clock signals DCC1_2 through DCC1_4 and the second through fourth backward delay clock signals DCC2_2 through DCC2_4, respectively.

According to an embodiment, in the select signal generator 14, an order of select signals input from the first delay circuit cell group 121 to the delay circuit cells in the forward direction and an order of select signals input from the second delay circuit cell group 122 to the delay circuit cells in the backward direction may be the same. In other words, the order of the select signals input to the first delay circuit cell group 121 and the order of the select signals input to the second delay circuit cell group 122 may be symmetrical. For example, when the first through fourth select signals S1 through S4 are input to the delay circuit cells of the first delay circuit cell group 121 in the forward direction, the first through fourth select signals S1 through S4 may be input to the delay circuit cells of the second delay circuit cell group 122 in the backward direction.

Figure 13:
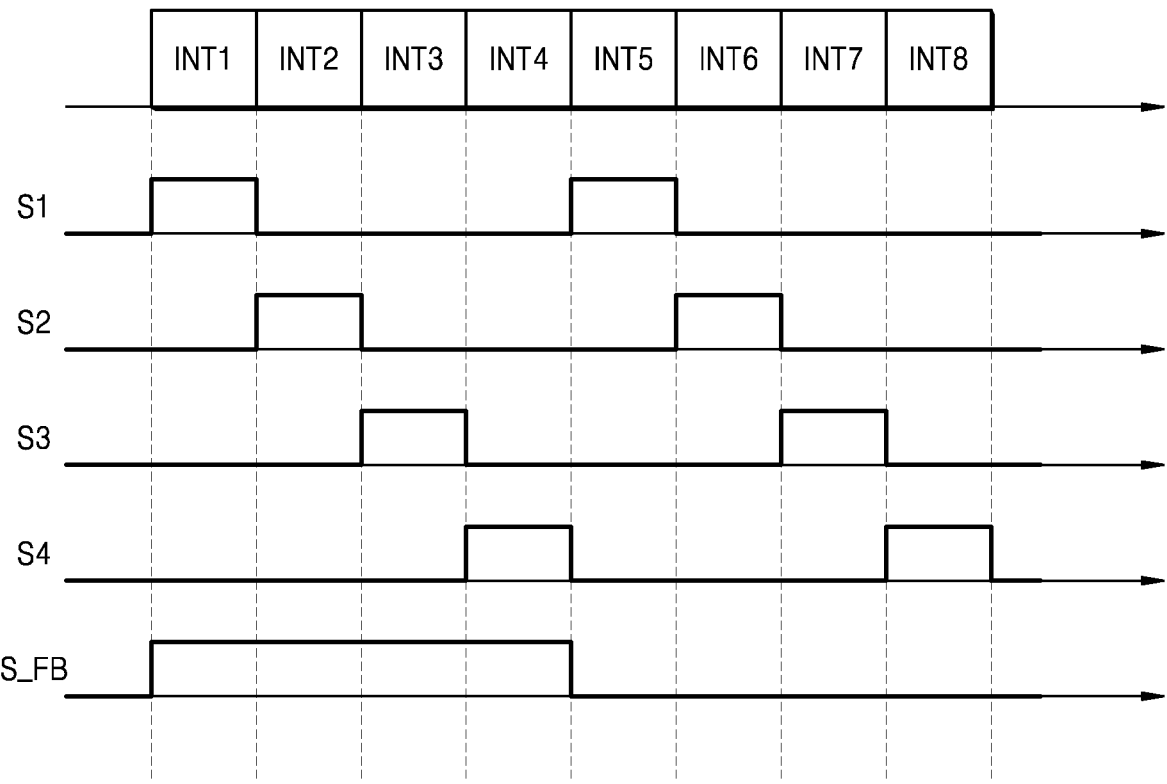
FIG. 13 is a graph of select signals applied to a delay circuit cell for generating different delay clock signals in the embodiment of FIG. 12.

FIG. 13 is a graph of select signals applied to a delay circuit cell for generating different delay clock signals in the embodiment of FIG. 12. FIG. 14 is a table of delay levels of delay clock signals output according to the embodiments of FIGS. 12 and 13.

Referring to FIG. 13, the select signal generator 14 may provide a select signal of logic high to different delay circuit cells from each other during each integration time of the first through fourth integration times INT1 through INT4, and may provide a select signal of logic high to different delay circuit cells from each other during each integration time of the fifth through eighth integration times INT5 through INT8. In this case, the select signal generator 14 may provide the indication signal S_FB of logic high to all selectors 123 during the first through fourth integration times INT1 through INT4, and may provide the indication signal S_FB of logic low to all selectors 123 during the fifth through eighth integration times INT5 through INT8. As described above with reference to FIG. 8, when the select signal generator 14 provides a select signal of logic high to one of the first through fourth delay circuit cells 120_1 through 120_4, the select signal generator 14 may provide select signals of logic low to the remaining delay circuit cells.

The phase select circuit 12 may receive the indication signal S_FB for determining an output signal of the selector 123 from the select signal generator 14, and all selectors 123 included in the phase select circuit 12 may determine the output signal according to the logic state of one indication signal S_FB. Each selector 123 may receive a delay clock signal output by the first delay circuit cell group 121 at a first stage, and may receive a delay clock signal output by the second delay circuit cell group 122 at a second stage. In this case, the selector 123 may generate one of the two delay clock signals as the photo gate signal PSG. Because the selectors 123 corresponding to each pixel group 130 receive the same indication signal S_FB and generate the photo gate signal PSG, when the indication signal S_FB of logic high is received, the delay clock signals output by the first delay circuit cell group 121 may be generated as photo gate signals PSG, and when the indication signal S_FB of logic low is received, the delay clock signals output by the second delay circuit cell group 122 may be generated as photo gate signals PSG.

The select signal generator 14 may provide, during the second integration time INT2, the select signal of logic high to the second forward delay circuit cell DCC2_1 of the first delay circuit cell group 121 and the third backward delay circuit cell DCC3_2 of the second delay circuit cell group 122. Accordingly, the second forward delay circuit cell DCC2_1 and the third backward delay circuit cell DCC3_2 may output a delay clock signal delayed by 1 delay unit 1D from the reference clock signal CLK. Because the third forward delay circuit cell DCC3_1 and the second backward delay circuit cell DCC2_2 receive a select signal of logic low, they may output a delay clock signal delayed by 2 delay units 2D from the reference clock signal CLK, and the fourth forward delay circuit cell DCC4_1 and the first backward delay circuit cell DCC1_2 may output a delay clock signal delayed by 3 delay units 3D from the reference clock signal CLK. The fourth forward delay circuit cell DCC4_1 may receive an output signal of the fourth backward delay circuit cell DCC4_2, and delay the output signal by 1 delay unit 1D, and accordingly, may output a delay clock signal delayed by 4 delay units 4D from the reference clock signal CLK. In the same manner, the first forward delay circuit cell DCC1_1 may delay a signal received from the first backward delay circuit cell DCC1_2, and accordingly, output a delay clock signal delayed by 4 delay units 4D.

Referring to FIGS. 12 through 14, the phase select circuit 12 may receive the indication signal S_FB of logic high during the first through fourth integration times INT1 through INT4, and accordingly, may output a delay clock signal output by the first delay circuit cell group 121 as the photo gate signal PSG. Accordingly, during the first through fourth integration times INT1 through INT4, a delay clock signal having delay units as illustrated in the table of FIG. 10 may be output.

During the fifth through eighth integration times INT5 through INT8, the phase select circuit 12 may receive the indication signal S_FB of logic low, and accordingly, may output a delay clock signal output by the second delay circuit cell group 122 as the photo gate signal PSG.

Figure 15:
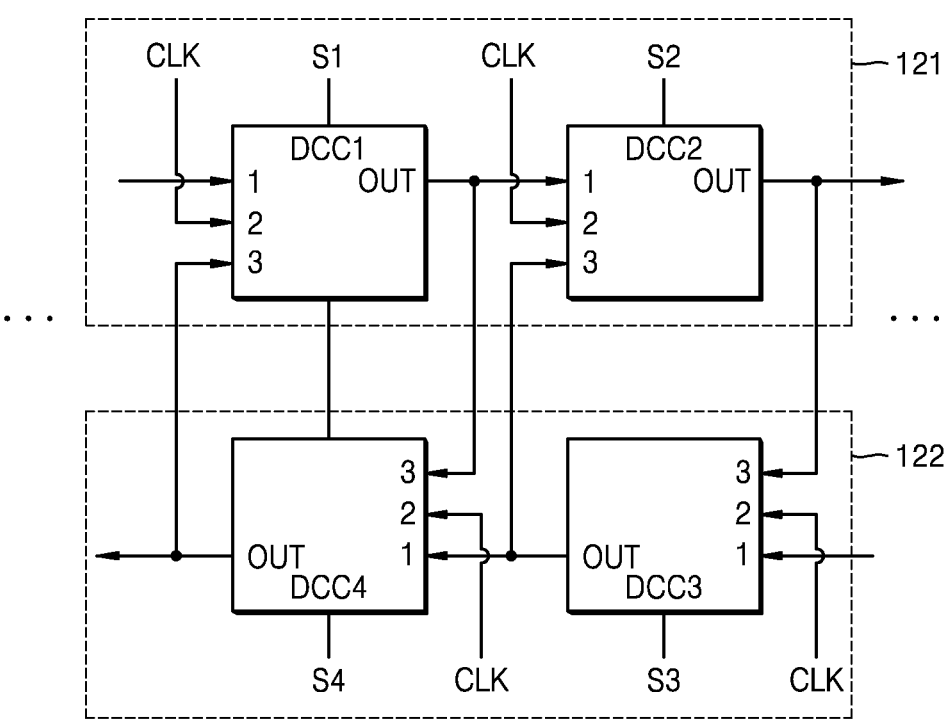
FIG. 15 is a circuit diagram of a phase select circuit including delay circuit cells outputting one of three inputs, according to an embodiment.

FIG. 15 is a circuit diagram of a phase select circuit 12c including delay circuit cells outputting one of three inputs, according to an embodiment.

Referring to FIG. 15, the phase select circuit 12c may include the first delay circuit cell group 121 and the second delay circuit cell group 122, and each of the delay circuit cells DCC1 through DCC4 may output one of three inputs as a delay clock signal. Each delay circuit cell DCC1, DCC2, DCC3, or DCC4 may receive the reference clock signal CLK of the same phase, and may receive a signal output from the delay circuit cell DCC1, DCC2, DCC3, or DCC4 of the same delay circuit cell group. In addition, each delay circuit cell DCC1, DCC2, DCC3, or DCC4 may receive a signal output by the delay circuit cell DCC1, DCC2, DCC3, or DCC4 of another delay circuit cell group corresponding to the same pixel group 130.

For example, the delay circuit cell DCC1, DCC2, DCC3, or DCC4 may receive a signal output from an adjacent delay circuit cell of the same delay circuit cell group. The adjacent delay circuit cell may be a delay circuit cell DCC1, DCC2, DCC3, or DCC4 arranged on the left or right of the target delay circuit cell, and an adjacent delay circuit cell of the delay circuit cell arranged on the leftmost side may be the rightmost delay circuit cell. When the delay circuit cell DCC1, DCC2, DCC3, or DCC4 does not receive an output signal from the adjacent delay circuit cell of the same delay circuit cell group, the corresponding delay circuit cell DCC1, DCC2, DCC3, or DCC4 may output the reference clock signal CLK or a signal output by the delay circuit cell DCC1, DCC2, DCC3, or DCC4 of another delay circuit cell group. According to FIG. 15, the target delay circuit cell DCC1, DCC2, DCC3, or DCC4 may receive an output signal from the delay circuit cell DCC1, DCC2, DCC3, or DCC4 located on the left side thereof. However, the inventive concept is not limited thereto.

Each delay circuit cell DCC1, DCC2, DCC3, or DCC4 may receive different select signals from each other, and may, according to the logic state of the received select signal, output any one of the delay clock signal of the first type delayed by a certain phase from the reference clock signal CLK, the delay clock signal of the second type delayed by a certain phase from an output signal of another delay circuit cell DCC1, DCC2, DCC3, or DCC4 of the same delay circuit signal group, and a delay clock signal of a third type delayed by a certain phase from an output signal of the delay circuit cell DCC1, DCC2, DCC3, or DCC4 of another delay circuit signal group. According to FIG. 15, the second delay circuit cell DCC2 may, according to an applied select signal, output any one of the reference clock signal CLK, a signal output by the first delay circuit cell DCC1, which is the adjacent delay circuit cell of the same delay circuit signal group, and a signal output by the third delay circuit cell DCC3, which corresponds to the same pixel group 130 and is the delay circuit cell DCC1, DCC2, DCC3, or DCC4 of the other delay circuit signal group.

The delay circuit cell DCC1, DCC2, DCC3, or DCC4 according to an embodiment may include a 3:1 multiplexer that outputs one of three input signals by receiving a 2-bit select signal. For example, the multiplexer may output a delay clock signal of the second type in response to receiving a select signal of '00' bit, a delay clock signal of the first type in response to receiving a select signal of '01' bit, and a clock signal of the third type in response to receiving a select signal of '10' bit. The 3:1 multiplexer of the embodiment of FIG. 15 is not limited thereto, and may include all embodiments in which delay clock signals of different types from each other are output in response to select signals of different bits from each other.

Figure 16:
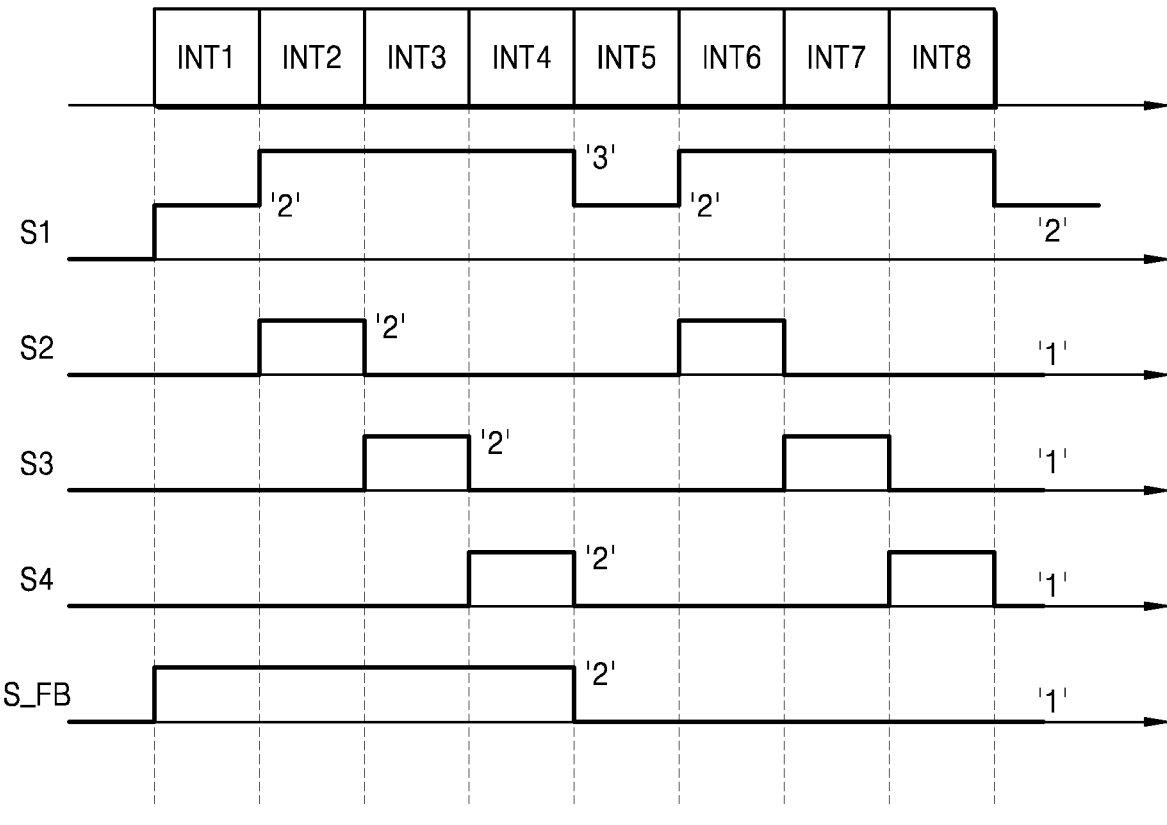
FIG. 16 is a graph of select signals applied to generate delay clock signals in the delay circuit cells according to FIG. 15.
Figure 17A:
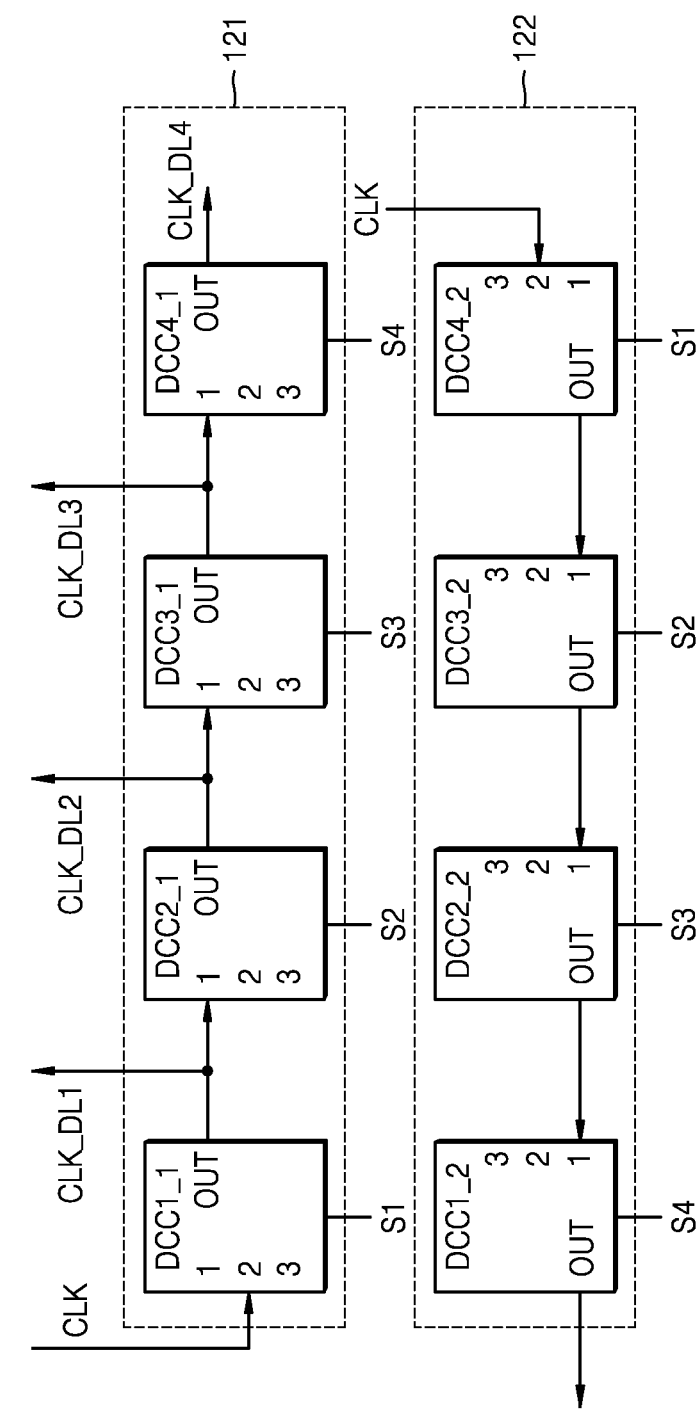
FIGS. 17A and 17B are block diagrams of examples in which the delay circuit cell transceives signals in FIG. 16 during the first integration time INT1 and the second integration time INT2, respectively.
Figure 17B:
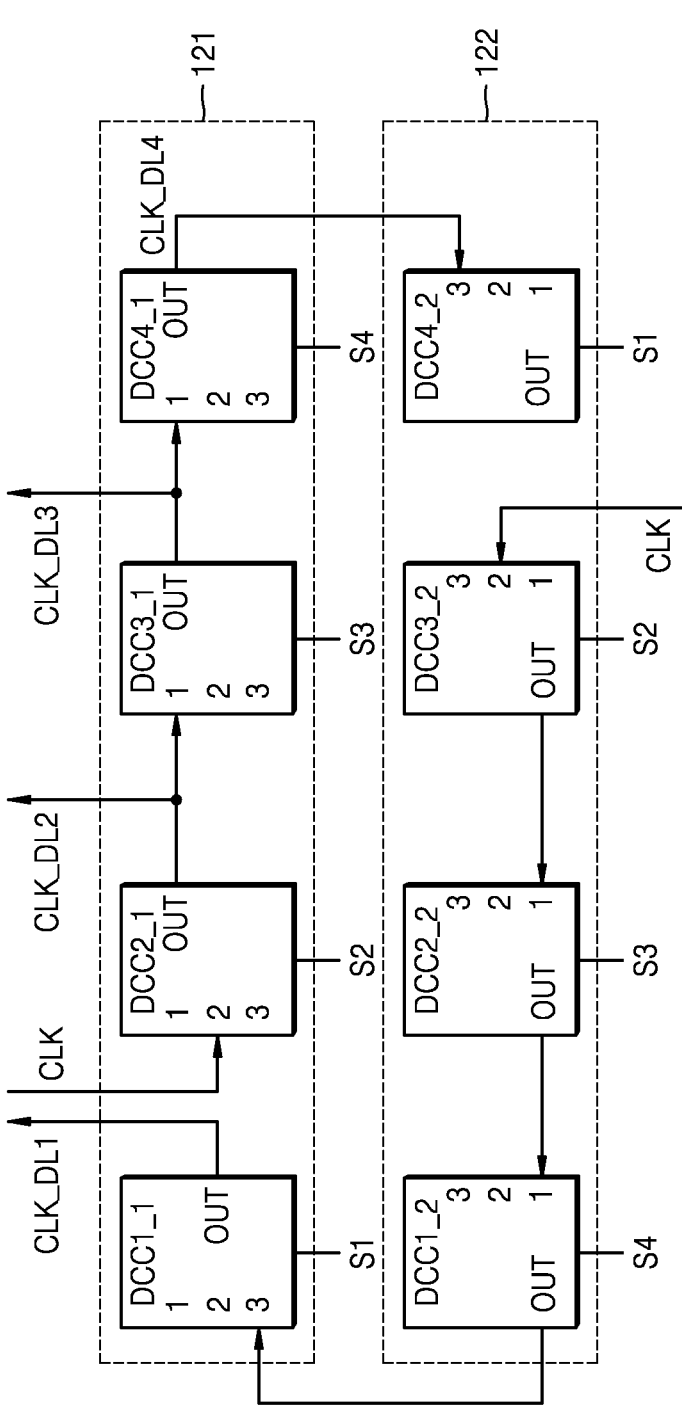

FIG. 16 is a graph of select signals applied to generate delay clock signals in the delay circuit cells according to FIG. 15. FIGS. 17A and 17B are block diagrams of examples in which the delay circuit cell transceives signals during the first integration time INT1 and the second integration time INT2, respectively.

FIGS. 17A and 17B are examples illustrating input and output signals of the phase select circuit 12 that has been replaced by a delay circuit cell receiving three inputs from the delay circuit cell receiving two inputs in FIG. 12.

Referring to FIG. 16, each delay circuit cell may receive one of the select signal of the first level through the select signal of the third level. In addition, referring to FIG. 12, the selectors 123 corresponding to the pixel group 130_1, 130_2, 130_3, or 130_n may provide the delay clock signal output by any one of the first and second delay circuit cell groups 121 and 122 based on the applied indication signal S_FB as the photo gate signal PSG to the pixel array 13. For example, the plurality of selectors 123 may generate a delay clock signal generated in the first delay circuit cell group 121 by receiving the indication signal S_FB of logic high during the first through fourth integration times INT1 through INT4 as the photo gate signal PSG, and may generate a delay clock signal generated in the second delay circuit cell group 122 by receiving the indication signal S_FB of logic low during the fifth through eighth integration times INT5 through INT8 as the photo gate signal PSG.

Referring to FIGS. 16 and 17A, during the first integration time INT1, the first forward delay circuit cell DCC1_1 and the fourth backward delay circuit cell DCC4_2 may output a delay clock signal of the certain phase difference from the reference clock signal CLK by receiving the first select signal S1 of the second level. Remaining delay circuit cells except for the first forward delay circuit cell DCC1_1 and the fourth backward delay circuit cell DCC4_2 may output a delay clock signal of the certain phase difference from an output signal of an adjacent delay circuit cell by receiving all select signals of the first level.

Referring to FIGS. 16 and 17B, during the second integration time INT2, the second forward delay circuit cell DCC2_1 and the third backward delay circuit cell DCC3_2 may output a delay clock signal of the certain phase difference from the reference clock signal CLK by receiving the second select signal S2 of the second level. In this case, the first forward delay circuit cell DCC1_1 and the fourth backward delay circuit cell DCC4_2 may receive the first select signal S1 of the third level, and accordingly, may output a delay clock signal of the certain phase difference from an output signal of a delay circuit cell of another delay circuit signal group corresponding to the same pixel group 130_1, 130_2, 130_3, or 130_n. For example, the first forward delay circuit cell DCC1_1 may output a signal delayed by the certain phase difference from the output signal of the first backward delay circuit cell DCC1_2, and the fourth backward delay circuit cell DCC4_2 may output a signal delayed by the certain phase difference from the output signal of the fourth forward delay circuit cell DCC4_1**.

Figure 18:
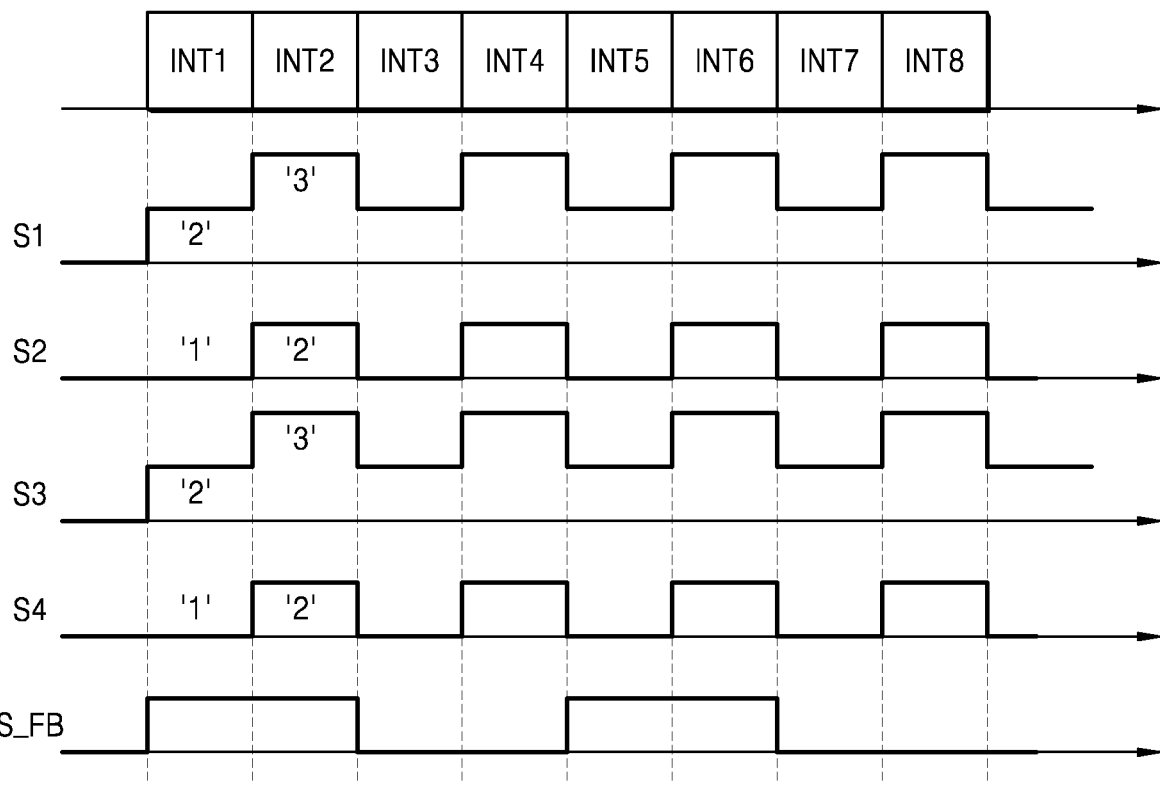
FIG. 18 is a graph of select signals of an image sensor having integration times different from those in the embodiment of FIG. 16.
Figure 19A:
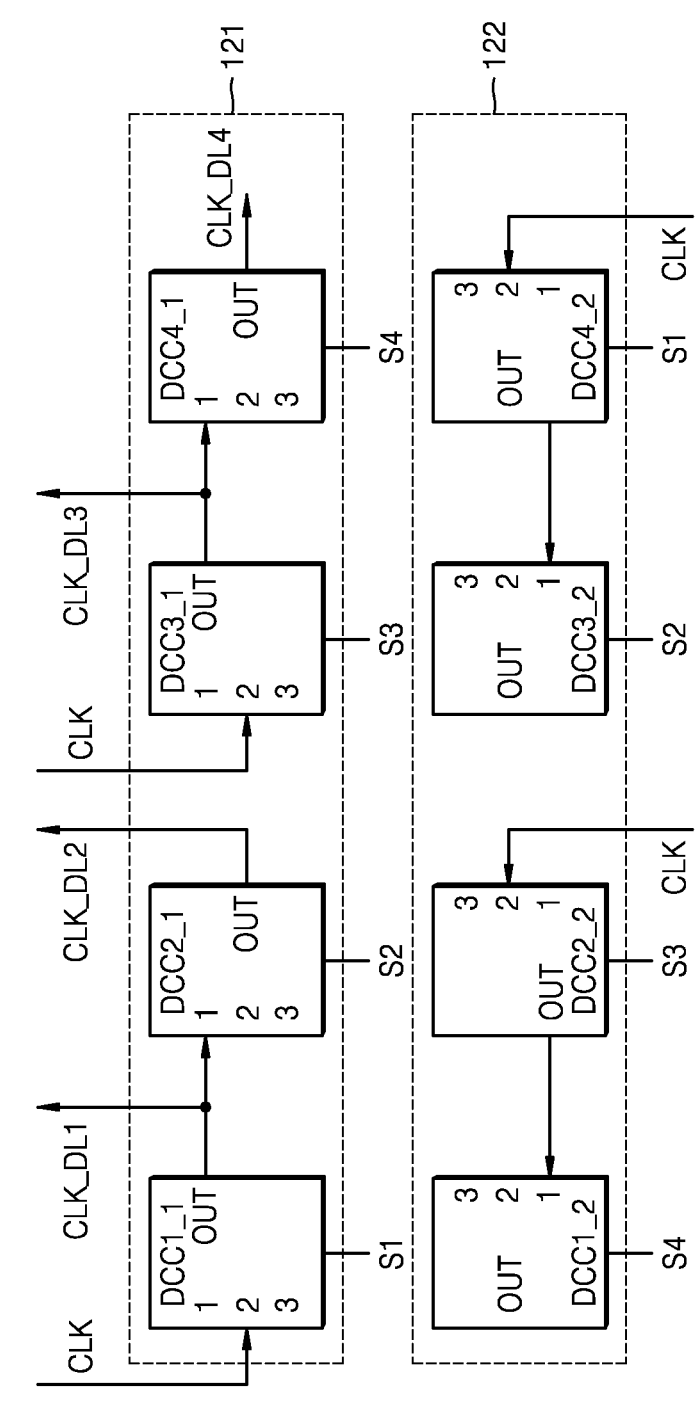
FIGS. 19A and 19B are block diagrams of examples in which the delay circuit cell transceives signals in FIG. 18 during the first integration time INT1 and the second integration time INT2, respectively.
Figure 19B:
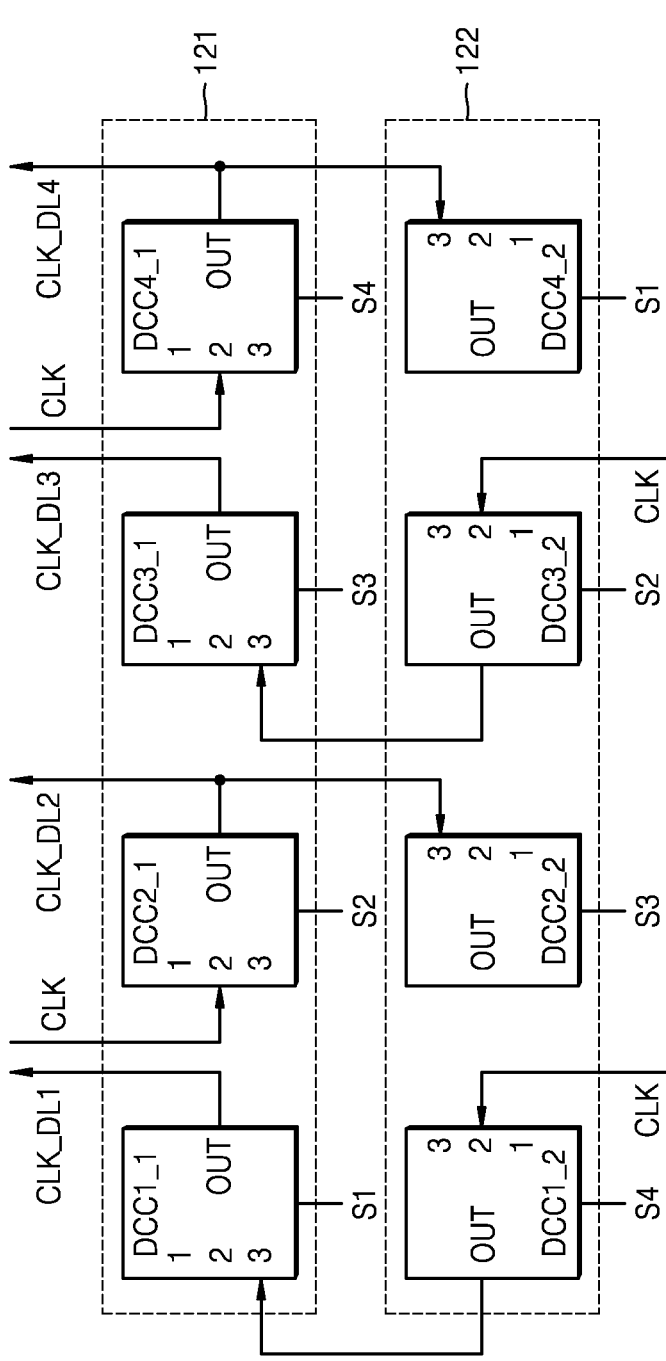

FIG. 18 is a graph of select signals of an image sensor having a integration time different from those in the embodiment of FIG. 16. FIGS. 19A and 19B are block diagrams of examples in which the delay circuit cell in FIG. 18 transceives signals during the first integration time INT1 and the second integration time INT2, respectively.

Referring to FIG. 18, the image sensor including the delay circuit cells in FIG. 15 may apply a delayed clock signal delayed by the certain phase difference from the reference clock signal CLK to a plurality of pixel groups 130_1, 130_2, 130_3, through 130_n during each integration time. The select signal generator 14** may apply a select signal of the second level to a plurality of delay circuit cells among one delay circuit cell group in response to each integration time.

Referring to FIG. 19A, during the first integration time INT1, the select signal generator 14 may apply a select signal of the second level to the first forward delay circuit cell DCC1_1 and the third forward delay circuit cell DCC3_1 of the first delay circuit cell group 121, and the phase select circuit 12 may generate the first delay clock signal CLK_DL1 and the third delay clock signal CLK_DL3 delayed by the certain phase difference from the reference clock signal CLK. In this case, the second forward delay circuit cell DCC2_1 and the fourth forward delay circuit cell DCC4_1 may, by receiving a select signal of the first level, generate the second delay clock signal CLK_DL2 and the fourth delay clock signal CLK_DL4 delayed by the certain phase difference from the first forward delay circuit cell DCC1_1 and the third forward delay circuit cell DCC3_1, respectively.

Referring to FIG. 19B, during the second integration time INT2, the second forward delay circuit cell DCC2_1 and the fourth forward delay circuit cell DCC4_1 may receive a select signal of the second level, and may generate the second delay clock signal CLK_DL2 and the fourth delay clock signal CLK_DL4 delayed by the certain phase difference from the reference clock signal CLK. In this case, the second backward delay circuit cell DCC2_2 and the fourth backward delay circuit cell DCC4_2 may receive output signals of the second forward delay circuit cell DCC2_1 and the fourth forward delay circuit cell DCC4_1 by receiving a select signal of the third level. In other words, the delay circuit cell may receive a signal output by a delay circuit cell that corresponds to the same pixel group 130_1, 130_2, 130_3, or 130_n and is included in another delay circuit cell group in response to the select signal of the third level, and the phase select circuit 12 may form a delay loop via some delay circuit cells of a plurality of delay circuit cells. Referring to FIGS. 19A and 19B, the phase select circuit 12 may form a first delay loop by using the first and second forward delay circuit cells DCC1_1 and DCC2_1 and the first and second backward delay circuit cells DCC1_2 and DCC2_2, and a second delay loop by using the third and fourth forward delay circuit cells DCC3_1 and DCC4_1 and the third and fourth backward delay circuit cells DCC3_2 and DCC4_2. In other words, compared to forming a delay loop by using all of the delay circuit cells in an embodiment of FIG. 12**, according to an embodiment of the inventive concept, a delay loop may be formed by using some delay circuit cells.

The image sensor of embodiments of the inventive concept may control the maximum delay unit of a delay clock signal by forming a plurality of delay loops according to the select signal of the third level. For example, according to FIGS. 12 through 14, the image sensor may generate a delay clock signal of up to 4 delay units 4D by forming one delay loop, and according to FIGS. 18 through 19B, a delay clock signal having up to 2 delay units 2D may be generated by forming two delay loops.

FIG. 20 is a block diagram of a schematic configuration of an image sensor including a buffer circuit 2300, according to an embodiment.

Referring to FIG. 20, the image sensor may include a clock signal generator 2100, a phase select circuit 2200, the buffer circuit 2300, a pixel array 2400, and a select signal generator 2500. Since it has already been described that the phase select circuit 2200 generates the delay clock signal CLK_DL by receiving the reference clock signal CLK and the select signal SEL from the clock signal generator 2100 and the select signal generator 2500 with reference to FIGS. 4 through 19, a further detailed description thereof is omitted for convenience of explanation.

The phase select circuit 2200 according to an embodiment may include a plurality of delay circuit cells 2210_1 through 2210_n**.

The pixel array 2400 according to an embodiment may form pixels corresponding to a plurality of columns or rows as one pixel group 2410_1, 2410_2, 2410_3, or 2410_n, and may transmit the delay clock signal CLK_DL (e.g., CLK_DL1, CLK_DL2, CLK_DL3, CLK_DLn) generated by each delay circuit cell of the phase select circuit to each pixel group. For example, a first pixel group 2410_1 may include a group of pixels connected to the plurality of columns, and the image sensor may provide the first delay clock signal CLK_DL1 generated by a first delay circuit cell 2210_1 to the first pixel group 2410_1** via a buffer circuit.

The buffer circuit 2300 according to an embodiment may include a plurality of buffer cells 2310_1 through 2310_*n* corresponding to each delay circuit cell. Each buffer cell 2310_1, 2301_2, 2310_3, or 2310_*n* may include a plurality of buffers, and each of the plurality of buffers may be exemplarily connected to a binary tree in FIG. 5. Accordingly, each buffer cell may receive a delay clock signal of a delay circuit cell, and provide the delay clock signal to a plurality of columns or rows. For example, a first buffer cell 2310_1 may receive the first delay clock signal CLK_DL1, and may provide delay clock signals of the same phase as the first delay clock signal CLK_DL1 in correspondence to the number of columns of the first pixel group 2410_1 to the columns of the first pixel group 2410_1. Accordingly, even when pixels of the same pixel group are connected to a plurality of columns or rows, an image sensor may provide delay clock signals of the same phase to each pixel.

As is traditional in the field of the present inventive concept, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the inventive concept has been particularly shown and described with reference to embodiments thereof, it will be understood that various changes in form and detail may be made therein without departing from the spirit and scope of the inventive concept as defined by the following claims.

What is claimed is:

1. An image sensor, comprising:
   a phase select circuit comprising a plurality of delay circuit cells configured to:
   receive a reference clock signal and a select signal associated with a logic state;
   generate a plurality of delay clock signals based on the reference clock signal and the logic state of the select signal, the plurality of delay clock signals having phases different from each other and from a phase of the reference clock signal; and
   output the generated plurality of delay clock signals; and
   a plurality of pixels, each pixel of the plurality of pixels being configured to:
   receive a corresponding delay clock signal among the plurality of delay clock signals output from the phase select circuit as a photo gate signal to control transmission of photoelectric charges generated by at least one photoelectric conversion element of the pixel; and
   output a pixel signal corresponding to the photo gate signal.

2. The image sensor of claim 1, further comprising:
   a clock signal generator that provides the reference clock signal to the plurality of delay circuit cells.

3. The image sensor of claim 2, wherein the clock signal generator comprises a buffer tree comprising a plurality of buffers, and provides the reference clock signal of an identical phase to the plurality of delay circuit cells.

4. The image sensor of claim 1, wherein each of the delay circuit cells outputs a first delay clock signal comprising a first phase difference from the reference clock signal in response to a select signal of a first level, and a second delay clock signal comprising a second phase difference from an output signal of another delay circuit cell in response to a select signal of a second level.

5. The image sensor of claim 4, wherein, in the phase select circuit, any one of the plurality of delay circuit cells receives the select signal of the first level in response to each integration time, and delay circuit cells except for the delay circuit cell that has received the select signal of the first level receive the select signal of the second level.

6. The image sensor of claim 1, wherein the phase select circuit comprises:
   a first delay circuit cell group; and
   a second delay circuit cell group,
   wherein the plurality of delay circuit cells form a loop according to the select signal applied to one or more delay circuit cells of the first delay circuit cell group and the second delay circuit cell group.

7. The image sensor of claim 6, wherein, in the phase select circuit, the one or more delay circuit cells of the first delay circuit cell group provide an output signal to an adjacent delay circuit cell in a first direction, the one or more delay circuit cells of the second delay circuit cell group provide an output signal to an adjacent delay circuit cell in a second direction, a delay circuit cell arranged at an end of the first delay circuit cell group in the first direction provides an output signal to a delay circuit cell arranged at an end of the second delay circuit cell group in the first direction, and a delay circuit cell arranged at an end of the second delay circuit cell group in the second direction provides an output signal to a delay circuit cell arranged at an end of the first delay circuit cell group in the second direction.

8. The image sensor of claim 6, wherein the phase select circuit outputs, as a photo gate signal, a delay clock signal output by any one of the plurality of delay circuit cells corresponding to an identical pixel of the first delay circuit cell group and the second delay circuit cell group.

9. The image sensor of claim 6, wherein each of the plurality of delay circuit cells outputs a first delay clock signal of a first phase difference from the reference clock signal in response to the select signal of a first level, outputs a second delay clock signal of a second phase difference from an output signal of an adjacent delay circuit cell in response to the select signal of a second level, and outputs a third clock signal of a third phase difference from an output signal of another delay circuit cell corresponding to an identical pixel in response to a third select signal.

10. The image sensor of claim 1, further comprising:
   a select signal generator that provides the select signal to the plurality of delay circuit cells during each integration time.

11. The image sensor of claim 10, wherein the select signal generator provides the select signal indicating generation of a delay clock signal of a certain phase difference from the reference clock signal to different delay circuit cells during different integration times from each other.

12. An image sensor clock generator, comprising:
- a controller configured to output a command for generating photo gate signals;
- a clock signal generator configured to generate at least one reference clock signal during each integration time of a plurality of integration times of a frame in response to the command; and
- a select signal generator configured to:
  - generate a first select signal based on the command and output the generated first select signal to a phase select circuit for generating a first delay clock signal; and
  - generate a second select signal based on the command and output the generated second select signal to the phase select circuit for generating a second delay clock signal,
  - wherein the first delay clock signal has a first phase delayed from the at least one reference clock signal by a first degree, the first delay clock signal being applied to a first pixel group as a first photo gate signal to control transmission of photoelectric charges generated by one or more photoelectric conversion elements of the first pixel group, and
  - wherein the second delay clock signal has a second phase delayed from the at least one reference clock signal by a second degree, the second delay clock signal being applied to a second pixel group as a second photo gate signal to control transmission of photoelectric charges generated by one or more photoelectric conversion elements of the second pixel group.

13. The image sensor clock generator of claim 12, wherein the clock signal generator comprises a buffer tree comprising a plurality of buffers, and generates the reference clock signal of an identical phase in response to each of the pixel groups.

14. The image sensor clock generator of claim 12, further comprising:
- a phase select circuit comprising a plurality of delay circuit cells,
- wherein each of the plurality of delay circuit cells outputs one of the first delay clock signal and the second delay clock signal in response to the first select signal or the second select signal.

15. The image sensor clock generator of claim 14, wherein the phase select circuit comprises:

- a first delay circuit cell group; and
- a second delay circuit cell group,
- wherein the plurality of delay circuit cells form a loop according to at least one of the first select signal or the second select signal applied to one or more delay circuit cells of the first delay circuit cell group and the second delay circuit cell group.

16. The image sensor clock generator of claim 15, wherein the phase select circuit outputs a delay clock signal output by any one of delay circuit cells corresponding to an identical pixel group of the first delay circuit cell group and the second delay circuit cell group.

17. The image sensor clock generator of claim 14, wherein each of the plurality of delay circuit cells outputs a first delay clock signal of a first phase difference from the at least one reference clock signal in response to the first select signal of a first level, outputs a second delay clock signal of a second phase difference from an output signal of an adjacent delay circuit cell in response to the select signal of a second level, and outputs a third clock signal of a third phase difference from an output signal of another delay circuit cell corresponding to an identical pixel group in response to a third select signal.

18. A method for operating an image sensor comprising a plurality of pixels, the method comprising:
- generating, by a phase select circuit, a plurality of delay clock signals based on a reference clock signal and a logic state of a select signal, the plurality of delay clock signals having phases different from a phase of the reference clock signal and from each other;
- outputting, each of the plurality of delay clock signals to a corresponding pixel among the plurality of pixels as a photo gate signal to control transmission of photoelectric charges generated by at least one photoelectric conversion element of the pixel; and
- outputting, by the pixel of the plurality of pixels, at least one pixel signal corresponding to the photo gate signal.

19. The method of claim 18, further comprising:
- providing the reference clock signal to a plurality of delay circuit cells of the phase select circuit.

20. The method of claim 18, wherein outputting the delay clock signals comprises:
- outputting a first delay clock signal of a first phase difference from the reference clock signal in response to a select signal of a first level; and
- outputting a second delay clock signal of a second phase difference from an output signal of another delay circuit cell in response to a select signal of a second level.

* * * * *